(12) United States Patent
Hashimoto et al.

(10) Patent No.: US 7,031,822 B1
(45) Date of Patent: Apr. 18, 2006

(54) ON-VEHICLE ELECTRONIC CONTROL UNIT

(75) Inventors: Kohji Hashimoto, Tokyo (JP); Katsuya Nakamoto, Tokyo (JP); Yasuhiko Kannan, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/206,276

(22) Filed: Aug. 18, 2005

(30) Foreign Application Priority Data

Jan. 25, 2005 (JP) .................. P2005-016673

(51) Int. Cl.
*F02D 41/04* (2006.01)

(52) U.S. Cl. ................ 701/103; 701/114; 701/115

(58) Field of Classification Search ........... 701/103, 701/102, 110, 114, 115
See application file for complete search history.

(56) References Cited

U.S. PATENT DOCUMENTS

| 4,580,221 | A | * | 4/1986 | Isobe et al. ........... 701/105 |
| 5,351,283 | A | * | 9/1994 | Kunitomo ............. 455/573 |

FOREIGN PATENT DOCUMENTS

| JP | 1-147140 A | * | 6/1989 |
| JP | 7-160367 | | 6/1995 |
| JP | 7-218547 | | 8/1995 |
| JP | 8-121227 | | 5/1996 |
| JP | 8-177700 | | 7/1996 |

* cited by examiner

*Primary Examiner*—Hieu T. Vo
(74) *Attorney, Agent, or Firm*—Sughrue Mion, PLLC

(57) ABSTRACT

In an on-vehicle electronic control unit, error in output voltages from a constant voltage power supply circuit (C.V.P.S.) for use in a reference power supply of an A/D converter, occurs due to temperature rise. Whereby, there is a problem of the decrease of an A/D conversion accuracy. A C.V.P.S. supplies a voltage to analog sensors and to an AD converter. Furthermore, an output from a temperature sensor that is disposed in the neighborhood of the C.V.P.S. is stored in a memory as a contrast temperature data T at a time point of shipping. In addition, voltage fluctuation characteristic data due to the change of temperatures of the C.V.P.S. and detection fluctuation characteristic data accompanied by the change of voltages of the analog sensor group have preliminarily been stored, and the fluctuations in digital converted values accompanied with the change of temperatures in the neighborhood of the C.V.P.S. are compensated.

12 Claims, 10 Drawing Sheets

POWER SUPPLY VOLTAGE FLUCTUATION CHARACTERISTICS
ONE-POINT CALIBRATION

POWER SUPPLY VOLTAGE FLUCTUATION CHARACTERISTICS
TWO-POINT CALIBRATION

TEMPERATURE DETECTION SENSOR CHARACTERISTICS

ONE-POINT CALIBRATION

TWO-POINT CALIBRATION

ON-VEHICLE ELECTRONIC CONTROL UNIT

BACKGROUND OF THE INVENTION

1. Field of the Invention

The present invention relates to an on-vehicle electronic control unit that includes a microprocessor and an AD converter and controls an engine of vehicles, and that improves the reduction of control accuracy resulted from fluctuations in constant voltage output voltages due to temperature change of a constant voltage power supply circuit section serving to supply a reference voltage of an AD converter.

2. Description of the Related Art

According to the Japanese Patent Publication (unexamined) No. 218547/1995 (FIG. 1, Summary, Paragraph 0004) "Signal Measuring Device", a signal measuring device is proposed. This signal measuring device includes: input detection means for detecting inputs of an measured signal; analog/digital conversion means for performing analog-digital conversion of the above-mentioned measured signals to generate measurement data; storage means for storing the above-mentioned measurement data; and calibration signal generation means for generating-calibration signals; the signal measuring device being characterized in that upon storing the above-mentioned storage data, the above-mentioned calibration signals are measured to obtain measurement characteristic error of the signal measuring device, and error of the above-mentioned measurement data is calibrated using the foregoing measurement error. In this signal-measuring device, a concept of executing error compensation at the time of each measurement with the use of a temperature sensor is shown.

Further, according to the Japanese Patent Publication (unexamined) No. 177700/1996 (FIG. 2, Summary) "Electronic Control Unit of Engine", the following electronic control unit of engines is proposed. This electronic control unit includes a microcomputer that carries out overall control of driving an engine and peripheral devices thereof, and a load-driving transistor that drives loads based on a driving command to be outputted from this microcomputer. The electronic control unit is provided with ambient temperature monitoring means for monitoring an ambient temperature of mentioned load driving transistor, and current-carrying period limiting means for limiting the lower limit of a current-carrying period to this transistor when the foregoing ambient temperature to be monitored or a value equivalent thereto becomes not less than a predetermined limit value. For example, to prevent overheat of a transistor for driving an engine ignition coil, this known art discloses means for carrying out fuel-cut operation or suppression of an intake throttle valve opening.

According to the Japanese Patent Publication (unexamined) No, 121227/1996 (FIG. 2, Summary) "Electronic Control Unit of Engine", the following electronic control unit is proposed. This electronic control unit includes a transistor that drives an inductance load in synchronization with the rotation of an engine, and a Zener diode that is connected to this transistor to do arc-extinguishing of a fly-back voltage generated at OFF time of mentioned load. The electronic control unit is provided with temperature monitoring means for monitoring a temperature of the mentioned transistor or an ambient temperature thereof, and engine speed limiting means for limiting an engine speed when this temperature to be monitored or a value equivalent thereto comes to be not less than a predetermined limit value. For example, to prevent overheat of a transistor for driving a fuel injection solenoid valve, this known art discloses means for carrying out fuel-cut operation or suppression of an intake throttle valve opening.

Furthermore, according to the Japanese Patent Publication (unexamined) No, 160367/1995 (FIG. 1, Summary) "CPU Heat Generation Suppression Device", a CPU heat generation suppression device is disclosed. This CPU heat suppression device includes a temperature sensor that measures temperatures of a CPU, a clock frequency determination section that determines an optimum clock frequency to be input to the mentioned CPU based on information from mentioned temperature sensor, and a clock frequency alternation section that causes a clock frequency to be the clock frequency having been obtained in the mentioned clock frequency determination section.

SUMMARY OF THE INVENTION (1) Description of Problems of the Prior Arts

The prior art according to the Japanese Patent Publication (unexamined) No. 218547/1995 has a problem that an expensive calibration signal generation means must be provided as an permanent part, and a further problem exists in that fluctuation error of analog input signals due to fluctuation in power supply voltage being a reference cannot be determined.

The prior arts according to the Japanese Patent Publication (unexamined) No. 177700/1996 and the Japanese Patent Publication (unexamined) No. 121227/1996 are inventions related to means for monitoring temperature of a power transistor and suppressing heat generation using, e.g., a thermistor. As a result, a problem exists in that control accuracy is reduced in the case of occurrence of temperature change.

The prior art according to the Japanese Patent Publication (unexamined) No. 160367/1995 relates to the prevention of overheat of a microprocessor with the use of a temperature sensor. As a result, a problem exists in that control accuracy is reduced in the case of occurrence of temperature change.

(2) Description of Objects of Invention

A primary object of the present invention is to provide an on-vehicle electronic control unit capable of preventing the reduction in control accuracy caused by the fluctuation in output voltage of a constant voltage power supply circuit section that is fed with an electric power from an on-vehicle battery to generate a predetermined constant voltage output due to temperature change in an internal part, and improving the control accuracy.

A second object of the invention is to provide an on-vehicle electronic control unit capable of making the error overheat alarm or the heat generation suppression control of, e.g., a microprocessor using detection signals of a temperature detection sensor that is disposed for the purpose of improving the above-mentioned control accuracy.

An on-vehicle electronic control unit according to the present invention comprises:

a temperature detection sensor that is mounted on a vehicle, and that is fed with an electric power from a constant voltage power supply circuit section mounted on the mentioned vehicle to output a temperature detection voltage corresponding to a temperature in the neighborhood of the mentioned constant voltage power supply circuit section;

a multi-channel A/D converter that converts an output from analog sensors that are mounted on the mentioned vehicle including the mentioned temperature detection sensor to digital data using the mentioned constant voltage power supply circuit section as a reference power supply;

a non-volatile memory storing therein a specified temperature in the neighborhood of the mentioned constant voltage power supply circuit section that the mentioned temperature sensor has preliminarily measured, an output voltage from the mentioned constant voltage power supply circuit section at this temperature, a calibration processing data including a relation with a temperature detection voltage of the mentioned temperature detection sensor having been digital-converted with the mentioned multi-channel AD converter, and a conversion processing data including voltage fluctuation characteristics of the output voltage from the mentioned constant voltage power supply circuit section due to change in the mentioned neighborhood temperature having been preliminarily measured; and compensation operation means that estimates and operates a current output voltage of the mentioned constant voltage power supply circuit section from an output of the mentioned temperature detection sensor having been outputted from the mentioned multi-channel A/D converter on the basis of the mentioned calibration processing data and conversion processing data, and that compensates an output from the mentioned analog sensor having been outputted via the mentioned multi-channel A/D converter based on this operation result.

The on-vehicle electronic control unit according to the invention is capable of monitoring a neighborhood temperature, being a primary factor of voltage fluctuation in the constant voltage power supply circuit section, and estimating an output voltage from the constant voltage power supply circuit section on the basis of characteristic data having been preliminarily stored. Accordingly, it is possible to maintain necessary accuracy in comparison, for example, by making the operation and compensation of a comparison reference of, e.g., a comparison circuit that operates using an output voltage from a constant voltage power supply circuit section as a comparison reference voltage. Even if there is any voltage fluctuation individually in the constant voltage power supply circuit section or the temperature detection sensor, the output thereof is compensated with calibration processing data. As a result, it is unnecessary to have a constant voltage power supply circuit section of extremely high accuracy, thus there is an advantage of enabling to arrange the voltage power supply circuit section at an inexpensive cost.

Furthermore, even if a power transistor, being a switching element for driving an ignition coil or a fuel injection solenoid valve, is contained in the internal part of an electronic control unit and there is a temperature rise in internal part of the electronic control unit, it is possible to maintain calibration accuracy with the temperature detection sensor, thus enabling to obtain a small-sized and inexpensive electronic control unit.

As a result, it is possible to obtain a compensated digital detection output even if output voltage from the constant voltage power supply circuit section fluctuates due to a wide range of temperature change in the internal part of the electronic control unit. In addition, it is possible to likewise obtain a compensated digital detection outputs even if there is fluctuation individually in the output voltage of the constant voltage power supply circuit section or the temperature detection sensor. Thus, there is an advantage such that a constant voltage power supply circuit section can be arranged at an inexpensive cost.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiment 1

(1) Detailed Description of Arrangement of Embodiment 1

Figure 1:
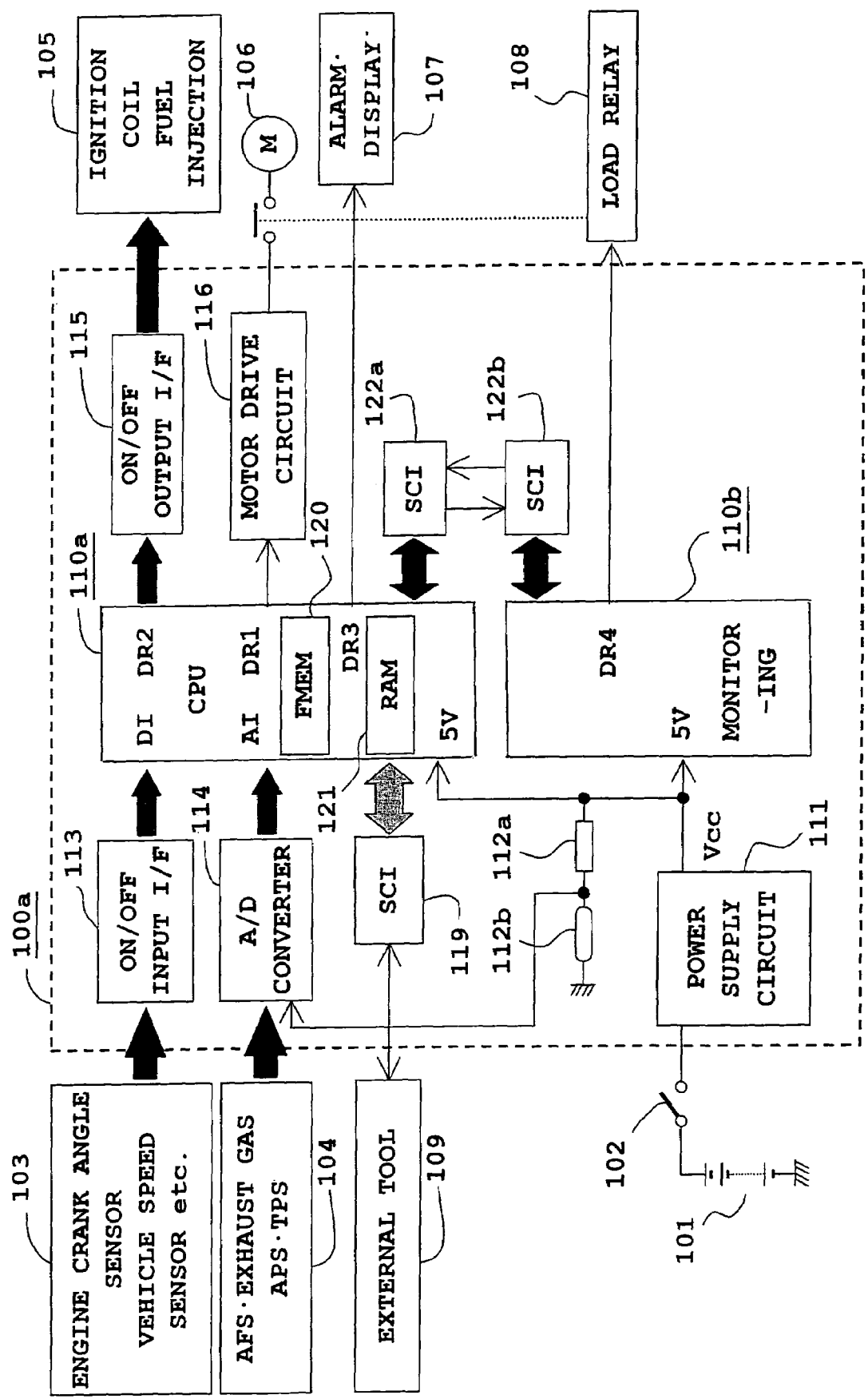
FIG. 1 is a block diagram of an entire on-vehicle electronic control unit according to a first preferred embodiment of the present invention.

FIG. 1 showing an entire block diagram of a first preferred embodiment unit according to the present invention is hereinafter described.

With reference to FIG. 1, an on-vehicle electronic control unit 100a (it may be hereinafter abbreviated as ECU) according to the first embodiment is mounted on an electronic board that is contained in a sealed housing, not shown, and is connected to external input/output devices as described later via a detachable connector, not shown.

An on-vehicle battery 101 generates a DC voltage, for example, DC 12V, and feeds an electric power to the ECU 100a via a power supply switch 102 such as key switch.

An ON/OFF sensor group 103 is a variety of ON/OFF switch group necessary for the engine control, for example, a crank angle sensor of engine, a speed sensor, or a selector switch of transmission.

An analog sensor group 104 includes a variety of analog sensors necessary for engine control such as airflow sensor that measures an air-intake of an engine, exhaust gas sensor, accelerator position sensor that detects depression degrees of an accelerator pedal, and a throttle position sensor that detects a throttle valve opening.

A current consumer group 105 is a variety of current consumers necessary for engine control such as fuel injection solenoid valve or ignition coil. In the case where an engine to which the invention is applied is not a gasoline engine but is a diesel engine, an ignition coil, which is described in the drawing, is not necessary.

A motor 106 is, for example, a DC magnet motor for electrically controlling an intake throttle valve opening.

An alarm display 107 is disposed at a position easy for a driver to view, and makes error notification, for example, in the case where a later-described microprocessor 110a is in abnormal overheat, or in the case of various errors such as disconnection•short circuit of the motor 106.

A load power supply relay 108 is an electromagnetic relay that operates in the case where the control of a throttle valve opening by means of the motor 106 becomes abnormal, and that interrupts the power feed circuit with respect to the motor 106.

An external tool 109 is a portable setting and displaying device to be connected to the ECU 100a at the time of carrying out delivery inspection at the manufacturing line of ECU 100a, delivery inspection at the manufacturing line of automobiles, or maintenance inspection at branch houses.

Now, a microprocessor 110a, as an internal element of the ECU 100a, operates in cooperation with a monitoring control circuit section 110b, and functions to control throttle valve openings in accordance with depression degrees of an accelerator pedal, to control fuel injection quantities in response to an air-intake of engine, or to drive an ignition coil or a fuel injection solenoid valve in synchronization with crank angle positions. The monitoring control circuit section 110b monitors the control operation of the microprocessor 110a, and de-energizes the load power supply relay 108 to stop the power feed to the motor 106 at the time of error occurrence.

A constant voltage power supply circuit section 111 is fed with an electric power from the on-vehicle battery 101 via the power supply switch 102, and generates a constant voltage output Vcc having a predetermined stable accuracy, for example, of DC 5V to feed an electric power to the microprocessor 110a and the monitoring control circuit section 110b.

A voltage-dividing resistor 112a and a temperature detection element 112b are connected in series to be fed with an electric power form the constant voltage power supply circuit section 111. Furthermore, the temperature detection element 112b is disposed in the neighborhood of the constant voltage power supply circuit section 111, and an internal resistance is changed as temperatures in the neighborhood of the constant voltage power supply circuit section 111 are changed.

An input interface circuit 113 is connected to a data bus between the ON/OFF sensor group 103 and the microprocessor 110a, and is a circuit including a noise filter circuit and a data selector.

A multi-channel AD converter 114 is connected to a data bus between the analog sensor group 104 and the microprocessor 110a, and is an analog/digital conversion circuit of, for example, 10-bit precision that includes, e.g., a noise filter and a data selector.

In addition, a temperature detection voltage outputted from the temperature detection element 112b, and a voltage-dividing voltage of the on-vehicle battery 101 are also connected to the inputs of the multi-channel AD converter 114.

An output interface circuit 115 is connected to a data bus between the current consumer group 105 and the microprocessor 110a, and is a circuit including, e.g., a latch memory and a switching element being an output transistor.

A switching element 116 is a power transistor that receives a control signal output from the microprocessor 110a, and carries out the power feed control with respect to the motor 106 to control a throttle valve opening.

A tool interface 119 is connected to a data bus between the external tool 109 and the microprocessor 110a, and is a serial interface circuit to be serial-connected to the external tool 109.

A non-volatile memory 120 and a RAM memory 121 for operation processing are bus-connected to the microprocessor 110a, and control programs and various control constant data are stored in the non-volatile memory 120 from the external tool 109 via the tool interface 119 and the microprocessor 110a.

A first serial-parallel converter 112a that is provided for serial communication of monitoring information is bus-connected to the microprocessor 110a, as well as a second serial-parallel converter 122b to be serial-connected to the first serial-parallel converter 122a is bus-connected to the monitoring control circuit section 110b.

Figure 2:
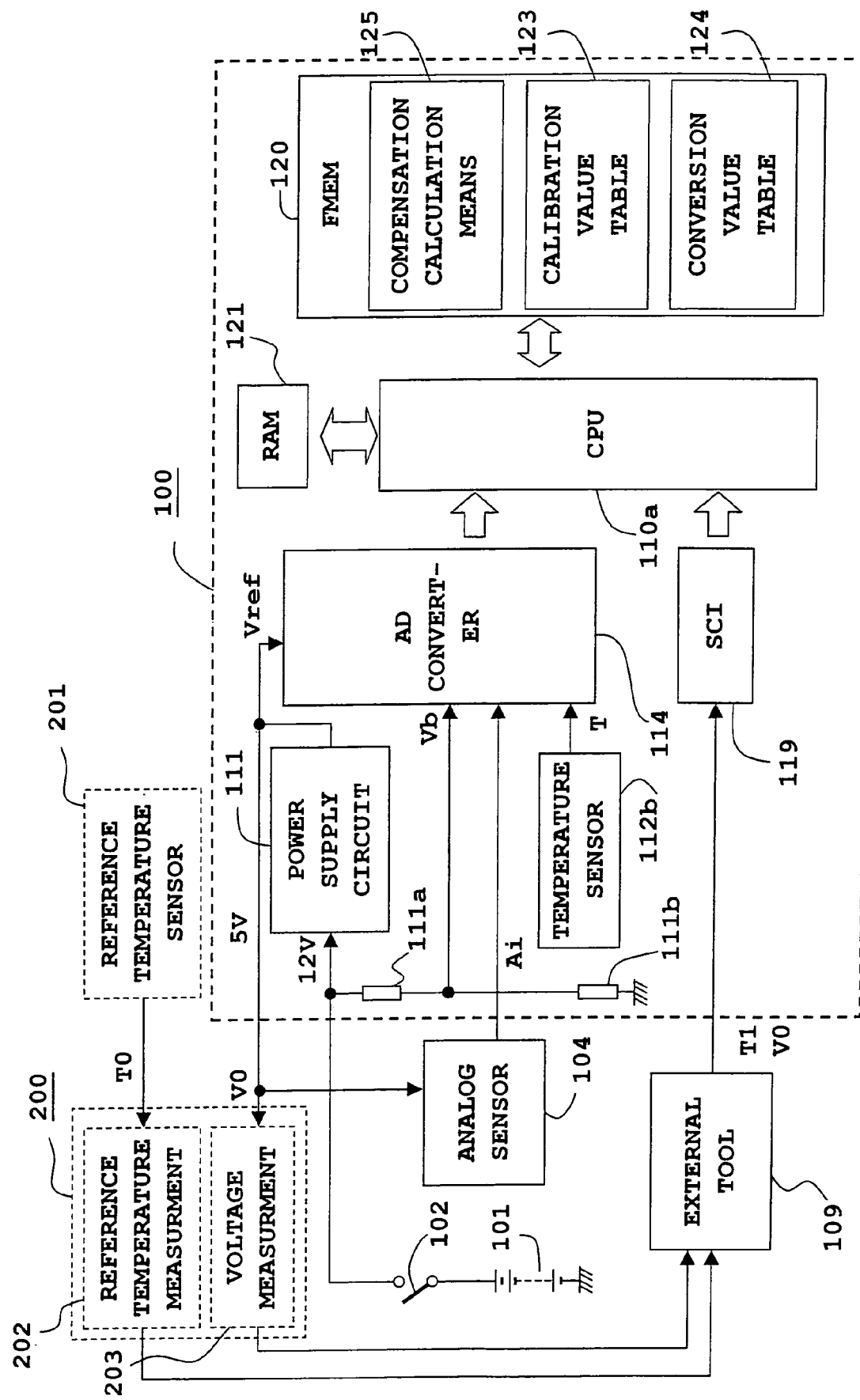
FIG. 2 is a block diagram of calibration control of the control unit of FIG. 1.

FIG. 2 showing a calibration control block diagram of FIG. 1 is hereinafter explained referring to characteristic charts shown in FIGS. 3 to 5.

With reference to FIG. 2, as a further external device connected to the above-described on-vehicle electronic control unit (ECU) 100a, there is an externally-disposed measuring device 200 consisting of a temperature measuring instrument 202 and a voltage measuring instrument 203. This externally-disposed measuring device 200 is to be used in shipping adjustment stage of the ECU 100a.

A reference temperature sensor 201 is connected to the temperature-measuring instrument 202. This reference temperature sensor 201 detects an environmental temperature close to the ECU 100a at the time of shipping adjustment.

Furthermore, although it is ideal for the reference temperature sensor 201 to measure temperatures in the neighborhood of the constant voltage power supply circuit section 111 in an internal part of the ECU 100a, the ECU 100a is a sealed housing a structure in which the reference temperature sensor 201 cannot be temporarily disposed.

Therefore, using an ECU 100a as an experiment unit, a second reference temperature sensor, which is intended to use with a lead wire pulled out to outside, has preliminarily been disposed in the neighborhood of the constant voltage power supply circuit section 111. In this manner, a temperature difference between that of this second reference temperature sensor and that of a reference temperature sensor 201 externally disposed close to the ECU 100a, is measured, whereby, a temperature in the neighborhood of a constant voltage power supply circuit section 111 of an actual product is estimated.

Value of a temperature TO close to the ECU 100a having been measured with the temperature measuring instrument 202 and value of a current constant voltage output VO of the constant voltage power supply circuit section 111 having been measured with the voltage measuring instrument 203 are stored in the non-volatile memory 120 of the ECU 100a via the external tool 109.

Further describing the internal arrangement of the ECU 100a, a constant voltage output Vcc of the constant voltage power supply circuit section 111 is connected to a reference voltage terminal of the multi-channel AD converter 114 being bus-connected to the microprocessor 110a, and acts as a reference voltage Vref.

Thus, when an input voltage that is applied to a certain input terminal of the multi-channel AD converter 114 is Ai, a digital converted value Di with respect to this input voltage Ai is expressed in the following expression:

$$Di = (Ai/Vref) \times K = (Ai/Vcc) \times K \quad (1)$$

$$K = 2^n - 1 \quad (2)$$

: where index n is a bit number, being a resolution of the multi-channel AD converter 114. On the supposition of, for example, 10 bit resolution, K=1023.

As is understood from the expression (1), it is meaningless to do digital conversion of a constant voltage output Vcc with the use of the multi-channel AD converter 114 arranged as mentioned above. Assuming that a constant voltage output Vcc is connected to one input terminal of the multi-channel AD converter 114 to perform the AD conversion, a digital converted value will be indicated to be a constant value K at all times no matter how largely a constant voltage output Vcc varies.

In addition, although a large number of analog signal voltages are inputted from the analog sensor group 104 to the multi-channel AD converter 114, a power supply voltage Vb, being one of the other input signals, is a divided voltage of voltage-dividing resistors 111*a* and 111*b* to be fed with power from the on-vehicle battery 101 via the power supply switch 102.

A temperature detection voltage T, being one of the other input signals to the multi-channel AD converter 114, is an electric potential at the connection point between the temperature detection element 112*b* and the voltage-dividing resistor 112*a*. However, actually used is an extended signal voltage that is obtained by amplifying a deviation voltage between this connection-point electric potential and a predetermined bias value.

The non-volatile memory 120 that cooperates with the microprocessor 110*a* contains control programs or control constant data to serve throttle valve opening control means, fuel injection control means, or ignition control means, as well as programs to serve compensation operation means 125, calibration processing data 123, and conversion processing data 124.

A calibration processing data 123 is stored as data obtained by transferring and writing from the external tool 109 a temperature TO and a voltage VO, being an external measured data having been measured by means of the temperature measuring instrument 202 and the voltage measuring instrument 203 in the adjustment operation stage of the ECU 100*a*, and additionally as a contrast data of a temperature detection voltage T of the temperature detection sensor 112*b* having been digital-converted with the multi-channel AD converter 114 at the time of adjustment operation.

In this regard, a temperature TO close to the ECU 100*a* is the one that is converted in the external tool 109 based on data having preliminarily been experimented and measured, and stored in the non-volatile memory 120 as a temperature T1 in the neighborhood of the constant voltage power supply circuit section 111. However, it is preferable that this conversion processing is executed in an internal part of the ECU 100*a*.

A conversion processing table 124 contains an average voltage fluctuation characteristic data that is statistically calculated by having been preliminarily measured and determined actually as to a large number of products in the aspect of fluctuation characteristics of neighborhood temperature versus output voltage from the constant voltage power supply circuit section 111, and an average detected fluctuation characteristic data that is statically calculated by having been preliminarily measured and determined actually as to a large number of sensors in the aspect of fluctuation characteristics of power supply voltage versus detected output voltage with respect to a part or all analog signals to be inputted to the multi-channel AD converter 114.

The compensation operation means 125 includes voltage estimation means for estimating an output voltage from the constant voltage power supply circuit section 111 under a different temperature environment by referring to a detected output from the temperature detection sensor 112*b* and calibration processing data 123 and conversion processing data 124, as well as detected value compensation means for obtaining a digital detection output having been compensated based on an output voltage having been estimated and an input voltage of an analog sensor.

Figure 3:
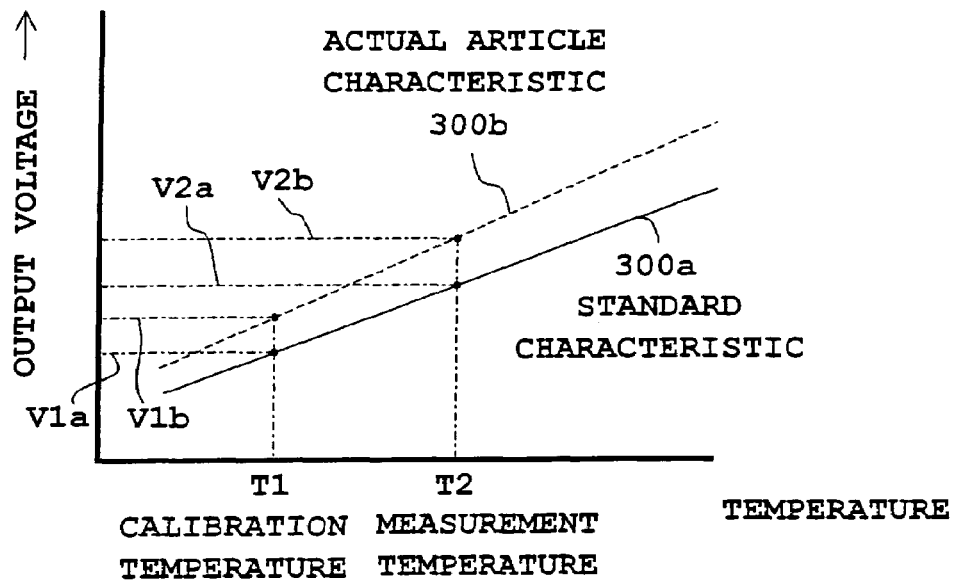
FIG. 3 are power supply voltage fluctuation characteristic charts of the control unit of FIG. 1.
Figure 3:
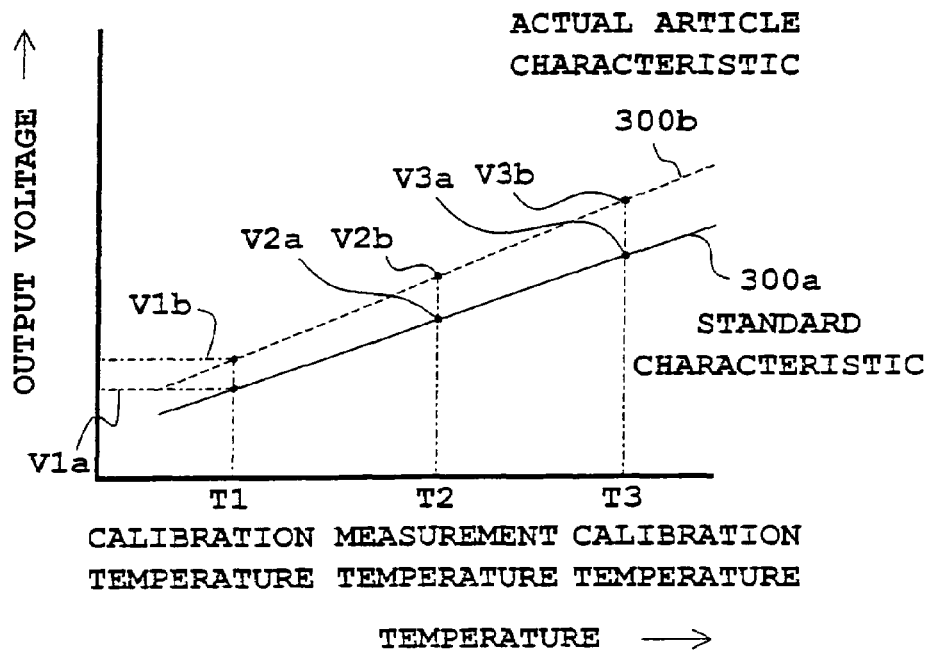

With reference to FIG. 3 (A), being a power supply voltage fluctuation characteristic chart of the arrangement shown in FIG. 1, the axis of abscissas indicates temperatures in the neighborhood of the constant voltage power supply circuit section 111, and the axis of ordinates indicates constant voltage outputs Vcc from the constant voltage power supply circuit section 111.

Standard characteristic 300*a* is an average characteristic of a large number of power supply voltage fluctuation characteristics as to the constant voltage power supply circuit section 111 that are stored in the non-volatile memory 120 as conversion processing data 124, being a data table or an approximation formula at a plurality of points. For example, an output voltage V1*a* at a calibration temperature T1 at the time of shipping adjustment or an output voltage V2*a* at a measurement temperature T2 that is measured with the temperature sensor 112*b* at the time of actual use are values to be calculated by substituting temperature T1 or T2 in the above-mentioned approximation formula, or to be calculated by interpolation operation in the case of data table.

Furthermore, the calibration temperature T1 is a conversion value obtained by converting an external temperature T0 close to the ECU 100*a*, which is measured with the temperature measuring instrument 202, to a temperature in the neighborhood of the constant voltage power supply circuit section 111 to be stored in the non-volatile memory 120.

Actual article characteristic 300*b* is a characteristic of the constant voltage power supply circuit section itself currently in use, and an output voltage thereof at a calibration temperature T1 is v1*b*.

In addition, output voltage V1*b* is a value of voltage that is actually measured with the voltage-measuring instrument 203, and written from the external tool 109.

In this manner, when the calibration temperature T1, actual-use measurement temperature T2, output voltages V1*a*, V2*a*, V1*b* are determined, a constant voltage output V2*b* from the constant voltage power supply circuit section 111 at the actual-use measurement temperature T2 is calculated with the following expression:

$$V2b = V2a \times (V1b/V1a) \quad (3)$$

FIG. 3(B) shows a power supply voltage fluctuation characteristic chart of the arrangement shown in FIG. 1 in the same manner as FIG. 3(A). This FIG. 3(B), however, shows an explanatory chart in the case where two-point calibration at a natural environmental temperature and a high environmental temperature is carried out as calibration temperature.

With reference to FIG. 3(B), a high-temperature calibration temperature T3 is a conversion temperature obtained by measuring a temperature close to the ECU 100a in a high-temperature environment with the temperature measuring instrument 202 and converting it to a temperature in the neighborhood of the constant voltage power supply circuit section 111 to be stored in the non-volatile memory 120. A constant voltage output V3b is an output voltage from the constant voltage power supply circuit section 111 that is obtained by writing a measured value of the voltage-measuring instrument 203 at a time point of high-temperature calibration in the non-volatile memory 120. A constant voltage output V3a is a standard output voltage from the constant voltage power supply circuit section 111 at the neighborhood temperature T3 that is calculated from an approximation formula or a data table of the standard characteristic 300a.

In this manner, when calibration temperatures T1, T3, actual-use measurement temperature T2, output voltages V1a, V2a, V3a, V1b, V3b are determined, a constant voltage output V2b from the constant voltage power supply circuit section 111 at the actual-use measurement temperature T2 is calculated with the following expression:

$$V2b = V2a \times (\alpha 1 \sim \alpha 3) \quad (4)$$

$$\alpha 1 = V1b/V1a, \ \alpha 3 = V3b/V3a \quad (5)$$

In addition, values of coefficients $\alpha 1 \sim \alpha 2$ are interpolated and operated so that they are close to a value of $\alpha 1$ when the actual-use measurement temperature T2 approaches the calibration temperature T1, and they are close to a value of $\alpha 3$ when the actual-use measurement temperature T2 approaches the calibration temperature T3.

Figure 4:
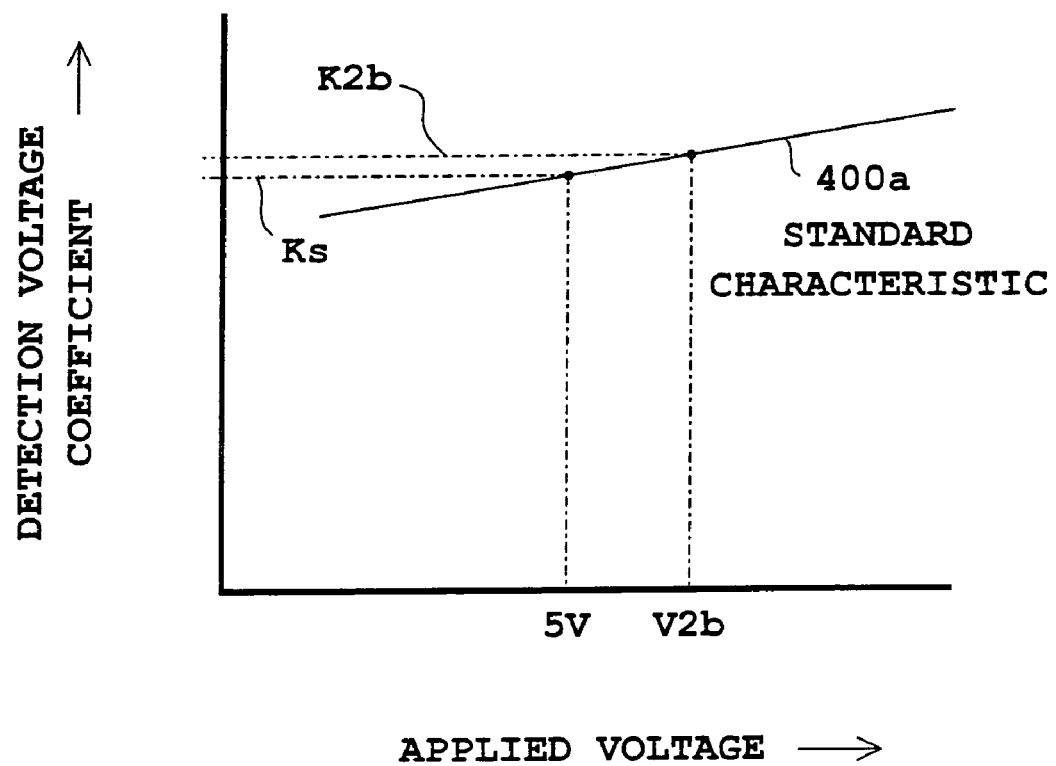
FIG. 4 is a detection voltage fluctuation characteristic chart of the control unit of FIG. 1.

With reference to FIG. 4, being a detection voltage fluctuation characteristic chart of the arrangement shown in FIG. 1, the axis of abscissas indicates a constant voltage output Vcc from the constant voltage power supply circuit section 111 to be applied to the analog sensor group 104, and the axis of ordinates indicates a detection voltage coefficient of a specified analog sensor, for example, an exhaust gas sensor in the analog sensor group 104. Although it is desirable that an oxygen concentration to be detected, for example, is constant without relation to a power supply voltage, even in the case of the same oxygen concentration, there is actually a slight fluctuation depending on a power supply voltage.

Standard characteristic 400a is a standard detection voltage fluctuation characteristic as to a specified analog sensor that is stored in the non-volatile memory 120 as conversion processing data 124, being a data table or an approximation formula at a plurality of points. For example, while a coefficient Ks=1 at a reference voltage 5V, a coefficient K2b at an applied voltage V2b can be calculated by substituting the voltage V2b in an approximation formula or by the interpolation operation from data table.

When a detection voltage coefficient is calculated, a value obtained by multiplying a digital converted value of an analog signal voltage having been actually obtained by this detection voltage coefficient will be a calibrated detection output.

In addition, in the case where the analog sensor is a potentiometer such as an accelerator position sensor or a throttle position sensor, an apparent detection voltage changes in proportion to a power supply voltage; however, a digital converted value thereof represents a rotational angle itself of the potentiometer to be a detection target irrelevant to a power supply voltage as is obvious from the expression (1). Thus, it is unnecessary to execute any calibration processing relative to the change in power supply voltage.

Furthermore, in the case of such an ideal sensor that voltages detected by means of an analog sensor are not affected by the change in power supply voltage and show values proportional to a physical quantity having been measured all the time, a digital converted value by means of the multi-channel AD converter 114 is affected by a power supply voltage (a constant voltage output Vcc from the constant voltage power supply circuit section 111 that is applied to a reference voltage terminal Vref) as shown in the expression (1), so that a coefficient K2b at an applied voltage V2b is calculated with the following expression:

$$K2b = V2b/5 \quad (6)$$

Figure 5A:
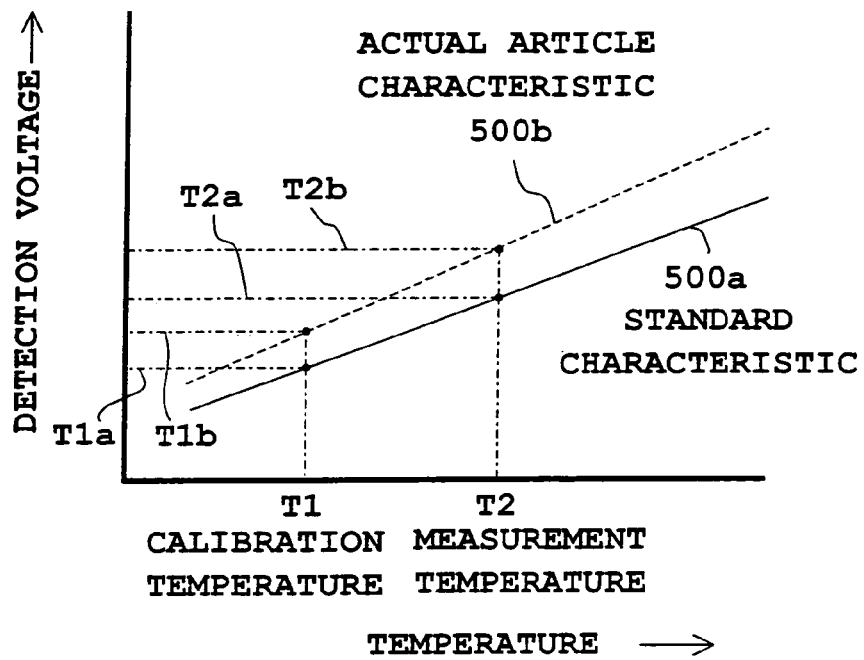
FIGS. 5(A) and (B) are characteristic charts of a temperature detection sensor of the control unit of FIG. 1.

With reference to FIG. 5(A), being a characteristic chart of a temperature detection sensor of the arrangement shown in FIG. 1, the axis of abscissas indicates temperatures in the neighborhood of the constant voltage power supply circuit section 111, and the axis of ordinates indicates temperature detection voltages of the temperature detection sensor 112b.

Standard characteristic 500a is an average characteristic of a large number of temperature detection characteristics as to the temperature detection sensor 112b that is stored in the non-volatile memory 120 as conversion processing data 124b, being a data table or an approximation formula at a plurality of points. For example, values of a detection voltage T1a at a calibration temperature T1 at the time of shipping adjustment, or of a measurement temperature T2 when a detection voltage is T2a are values to be calculated by substituting a temperature T1 or a detection voltage T2a in the mentioned approximation formula, or to be calculated by interpolation operation in the case of a data table.

In addition, a calibration temperature T1 is a conversion value obtained by converting an external temperature T0 close to the ECU 100a having been measured with the temperature measuring instrument 202, to a temperature in the neighborhood of the constant voltage power supply circuit section 111 to be stored in the non-volatile memory 120.

Actual article characteristic 500b is a characteristic of the temperature detection sensor 112b itself currently in use, and a detection voltage thereof at a calibration temperature T1 is written as T1b in the non-volatile memory 120.

In this manner, when a calibration temperature T1, detection voltages T1a, T1b are determined, a value of detection voltage T2a at the actual-use measurement temperature T2 when a detection voltage is T2b, is calculated with the following expression:

$$T2a = T2b \times (T1a/T1b) \quad (7)$$

When the detection voltage T2a is calculated, a value of actual-use measurement temperature will be calculated from standard characteristics 500a.

Figure 5B:
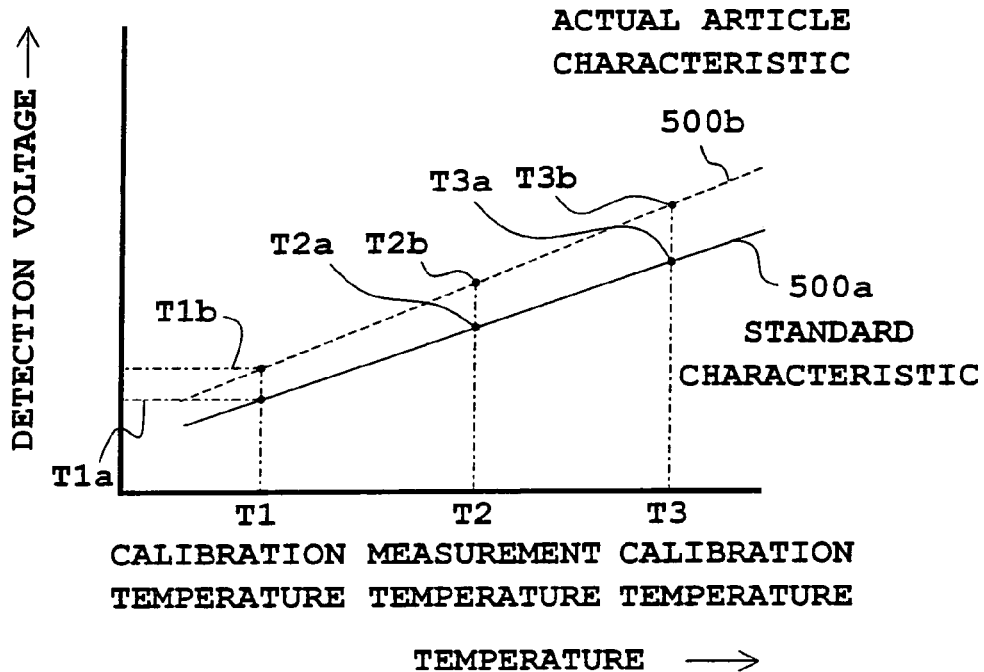

FIG. 5(B) shows a characteristic chart of a temperature detection sensor of the arrangement shown in FIG. 1 in the same manner as FIG. 5(A). This FIG. 5(B), however, shows an explanatory chart in the case of carrying out two-point calibration of a natural environmental temperature and a high environmental temperature as calibration temperature.

With reference to FIG. 5(B), a high-temperature calibration temperature T3 is a conversion temperature obtained by measuring a temperature close to the ECU 10a in a high-temperature environment with the temperature measuring instrument 202 and converting it to a temperature in the neighborhood of the constant voltage power supply circuit section 111 to be stored in the non-volatile memory 120. Detection voltage T3a is a detection voltage of the standard temperature detection sensor 122b at a neighborhood temperature T3 calculated from an approximation formula or a data table of standard characteristic 500a. A detection voltage T3b is a detection voltage of a temperature detection sensor 122b of an actual device at a time point of high-temperature calibration. This detection voltage T3b is a value that is measured with the voltage-measuring instrument 203 and stored in the non-volatile memory 120 in the same manner as the detection voltage T1b.

In this manner, when calibration temperatures T1, T3, detection voltages T1a, T3a, T1b, T3b are determined, a detection voltage T2a of the standard temperature detection sensor 112b when the detection voltage is T2b, will be calculated with the following expression:

$$T2a = T2b \times (\beta1 \sim \beta3) \qquad (8)$$

$$\beta1 = T1a/T1b, \ \beta3 = T3a/T3b \qquad (9)$$

In addition, values of coefficients β1~β2 are interpolated and operated so that they are close to a value of β1 when the actual-use measurement temperature T2 approaches the calibration temperature T1, and they are close to a value of β3 when the actual-use measurement temperature T2 approaches the calibration temperature T3.

Thus, when the detection voltage T2a is calculated, a value of the actual-use measurement temperature T2 will be calculated from the standard characteristic 500a.

Figure 6:
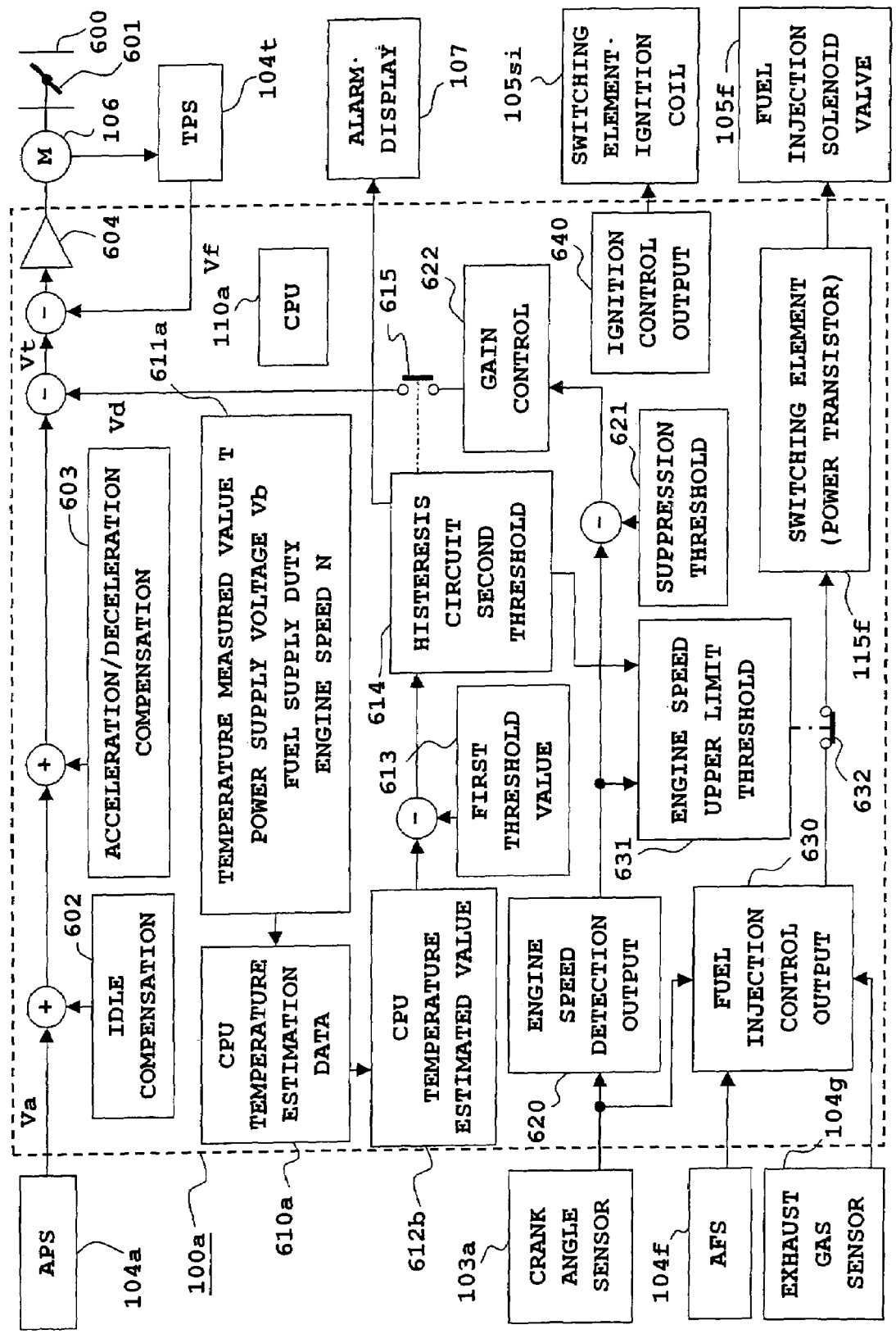
FIG. 6 is a block diagram of heat generation suppression control of the control unit of FIG. 1.
Figure 7:
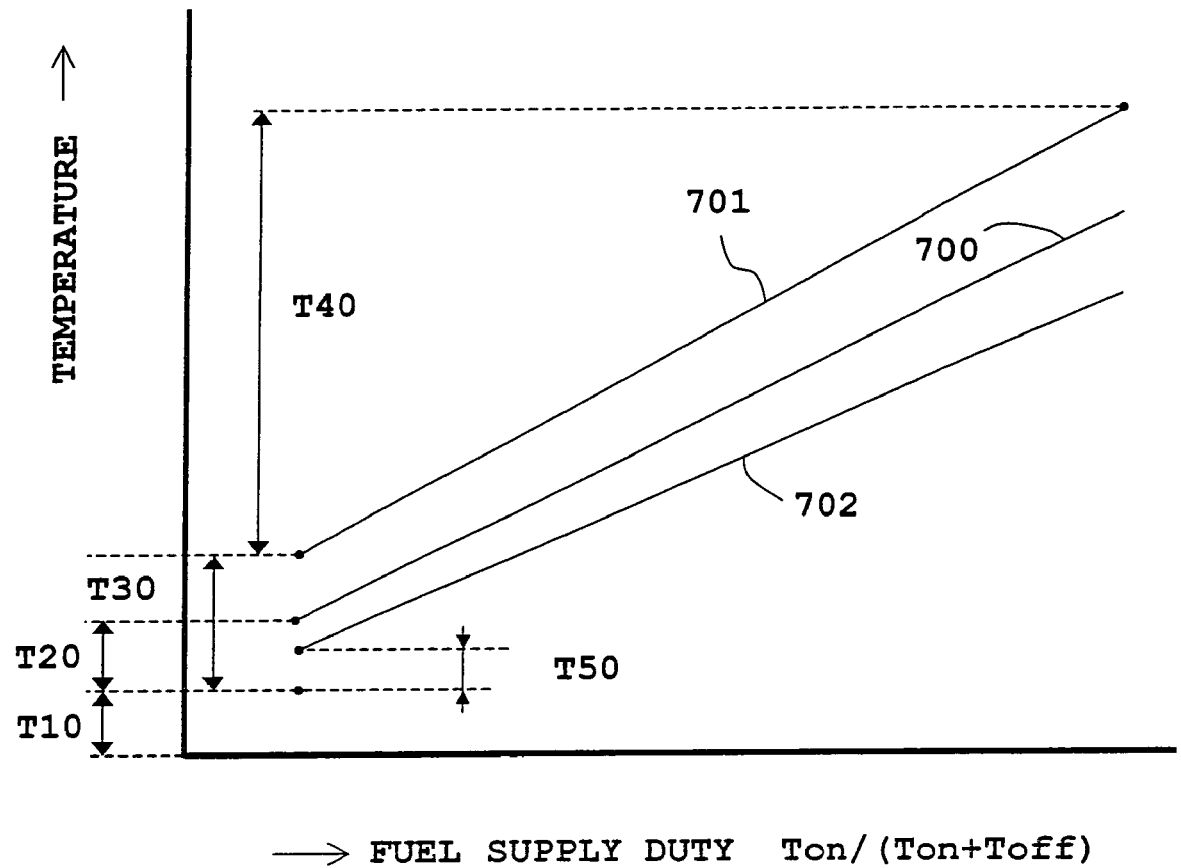
FIG. 7 is an explanatory characteristic chart of the control unit of FIG. 6.

FIG. 6, being an equivalent control block diagram of heat-generation suppression control to be executed with a microprocessor 110a in the arrangement shown in FIG. 1 is described referring to a characteristic chart shown in FIG. 7.

With reference to FIG. 6, a digital converted value of the accelerator position sensor 104a is inputted to the microprocessor as a primary target voltage Va of a throttle valve opening.

An idle compensation block 602 is a compensation block that responds to a detection output from a cooling water temperature sensor of an engine, not shown, and causes a target throttle valve opening to be slightly higher at a low temperature.

A acceleration/deceleration compensation block 603 is a compensation block that calculates a value proportional to a differential value of a detection output from the accelerator position sensor 104a as a rate of change in depression degree of an accelerator pedal, and compensates the target throttle valve opening higher at the time of sharp depression and compensates the target throttle valve opening lower when an accelerator pedal is returned speedily.

A feedback control block 604 executes PID control in the following manner. That is, a deviation voltage between a secondary target voltage Vt that is obtained by algebraic addition of a value compensated in the idle compensation block 602 and the acceleration/deceleration compensation block 603 with respect to a primary target voltage Va and further by subtraction of the later-described suppression voltage Vd, and a feedback voltage Vf, being a digital converted value of a throttle position sensor 104t, is amplified; and the motor 106 is driven while controlling ON/OFF ratio of the switching element 116 to control opening/closing of a throttle valve 601 that is mounted on the intake throttle 600 so as to be a throttle valve opening in response to a secondary target voltage Vt.

CPU temperature estimation reference data 610a is a data table or an approximation formula obtained by having been actually measured and determined preliminarily as to correlation characteristics related to a parameter data 611a including a power supply voltage Vb of the on-vehicle battery 101 and an engine speed N, or a fuel supply ratio Duty, being a ratio between a power feed ON time period and a power feed ON/OFF period with respect to a fuel injection solenoid valve 105f and a temperature measured value T by means of a temperature detection sensor 112b, and to a temperature around the microprocessor 110a.

CPU temperature estimation means 612a is means for calculating an environmental temperature of the microprocessor 110a responsive to a detection output from the temperature detection sensor 112b that is mounted in the neighborhood of the constant voltage power supply circuit section 111 by referring to CPU temperature estimation reference data 610a and actually measured values of the parameter data 611a. The detail thereof will be described later with reference to FIG. 7.

Error processing means 614 is a hysteresis circuit that operates when an estimated temperature provided by the CPU temperature estimation means 612a exceeds a first threshold 613, and is reset when the estimated temperature comes to be not more than a second threshold, being a value smaller than the first threshold 613. An alarm and display 107 is brought in operation when the error processing means 614 generates an error determination output, and a suppression command output 615 operates to make a suppression voltage Vd active.

Engine speed detection means 620 calculates an engine speed by the operation of ON/OFF operation density of a crank angle sensor 103a. When a calculated engine speed exceeds a predetermined suppression threshold 621, the suppression voltage Vd that is proportional to an excess of engine speed is generated via a gain adjustment means 622 and a suppression command output 615, thus causing a secondary target voltage Vt to decrease.

Fuel injection control means 630 operates in synchronization with the operation of the crank angle sensor 103a, causes a switching element 115f in conduction during a period proportional to an air-intake, which is detected with the airflow sensor 104f, to drive the fuel injection solenoid valve 105f, and compensates and controls a fuel supply quantity based on an air-fuel ratio that is detected by means of an exhaust gas sensor 104g.

Fuel supply stop means 631 is means that generates a fuel supply stop output 632 when the error processing means 614 generates an error determination output and when an output from the engine speed detection means 620 exceeds an upper limit threshold, being an engine speed larger than a suppression threshold 621, and that stops driving the fuel injection solenoid valve 105f.

Ignition control means 640 is disposed in the case of a gasoline engine, and generates a control output in synchronization with the operation of the crank angle sensor 103a to feed an electric power to an ignition coil 105si that contains therein a power transistor, being a switching element externally mounted.

With reference to FIG. 7, the axis of abscissas indicates values of a fuel supply duty Duty=Ton/(Ton+Toff) to be calculated with a current-carrying time period Ton and an interruption time period Toff, and the axis of ordinates indicates temperatures. Temperatures in the neighborhood of the constant voltage power supply circuit section 111 to be measured with the temperature detection sensor 112b are indicated with temperature characteristic 700, estimated temperatures in the neighborhood of the switching element 115f are indicated with temperature characteristic 701, and temperatures in the neighborhood of the microprocessor that are estimated with the CPU temperature estimation means 612a are indicated with a temperature characteristic 702.

The minimum temperature T10 is a temperature in the neighborhood of the constant voltage power supply circuit section 111 when a fuel supply duty Duty is the minimum value, an engine speed N is in the minimum state, and further a voltage of the on-vehicle battery 101 is a permitted minimum value. This minimum temperature T10 largely depends on an environmental atmospheric temperature, and is a temperature to which temperature rise owing to the other unspecified electric power consumption in the ECU 100a is added.

A first addition temperature T20 largely depends on an electric power consumption of the constant voltage power supply circuit section 111 that is determined depending on values of the power supply voltage Vb of the on-vehicle battery 101 and an output current from the constant voltage power supply circuit section 111, and is a temperature to which the other effect of an electric power consumption of the switching element 115f is added.

A second addition temperature T30 largely depends on an electric power consumption of the switching element 115f that is determined on the fuel supply duty Duty and an engine speed N, and is a temperature to which the other effect of an electric power consumption of the constant voltage power supply circuit section 111 is added.

A third addition temperature T40 is correspondent to temperature rise of the switching element 115f that depends on an electric power consumption of the switching element 115f when a fuel supply duty Duty is the maximum.

A fourth addition temperature T50 is correspondent to temperature rise obtained by addition of the effects of an electric power consumption of the microprocessor 110a and an electric power consumption of the constant voltage power supply circuit section 111 or the switching element 115f.

In addition, an electric power consumption of the switching element 115f is the one to which a conduction loss proportional to a fuel supply duty Duty and a fly-back energy, which is generated at the time of current interruption, are added. An electric power consumption of this fly-back energy is a value proportional to a fuel supply frequency, that is, an engine speed.

In this manner, on condition that standard temperature characteristics 700•701•702 are measured and stored, temperatures in the neighborhood of the microprocessor 110a at an actual power supply voltage Vb, a fuel supply duty Duty, and an engine speed N can be estimated and operated with accuracy.

To calculate with accuracy an electric power consumption of the constant voltage power supply circuit section 111, a voltage of the on-vehicle battery 101 and a load current of the constant voltage power supply circuit section 111 just have to be made clear. In the case where detection output of a load current cannot be obtained, it can be estimated with an average load current.

Primary factors to determine an electric power consumption of the switching element 115f are a fuel supply Duty and an engine speed N of the engine. However, even if these factors are changed, temperatures of the switching element 115f are not sharply changed, but a response delay occurs due to a thermal time constant τ of the switching element 115f.

Accordingly, an electric power consumption having been calculated with a fuel supply Duty and an engine speed N is moving-averaged and used, and the temperature rise of the switching element 115f is estimated with an average value of a time period from the current time to the past time τ.

The temperature rise of the constant voltage power supply circuit section 111 goes in the same manner.

(2) Detailed Description of Action•Operation of Embodiment 1

In the device according to the first embodiment of this invention arranged as shown in FIGS. 1 and 2, at the stage of shipping adjustment of an on-vehicle electronic control unit (ECU) 100a, basic information, e.g., control programs such as communication control program, throttle valve opening control program, fuel injection control program or ignition control program, and control constant data are transferred and written in the non-volatile memory 120 from the external tool 109 via the microprocessor 110a.

Transfer and write information with respect to the non-volatile memory 120 includes conversion processing data, program acting as compensation operation means, CPU temperature estimation reference data, program acting as CPU temperature estimation means, switching element temperature estimation reference data, program acting as switching element temperature estimation means, program acting as error processing means, program acting as heat-generation suppression means, program acting as fuel supply stop means, and calibration processing data.

As the calibration processing data, a temperature in the neighborhood of the constant voltage power supply circuit section 111 to be estimated from a temperature close to the ECU 100a, which is measured with high accuracy by means of an externally-disposed measuring device 200, and an actual constant voltage output voltage from the constant voltage power supply circuit section 111 are transferred and written in the non-volatile memory 102 from the external tool 109 via the microprocessor 110a. Furthermore, a digital converted value with respect to a temperature detection voltage of the temperature sensor 112b at the same time point is also transferred and written in the non-volatile memory 120 from the multi-channel AD converter 114 via the microprocessor 110a.

To perform the highly accurate calibration, when storing a calibration processing data under the room temperature environment and under the high-temperature environment, first a calibration processing data in the room temperature environment is stored, and thereafter an ECU 100a is put in a high-temperature reservoir and heated to store a calibration processing data in the high-temperature environment.

When the power supply switch 102 is brought in a closed circuit, and an engine, not shown, is started in the stage of actually operating a vehicle, the microprocessor 110a drives and controls the current-consumer group 105 such as fuel injection solenoid valve or ignition coil and the motor 106 for controlling a throttle valve opening, on the basis of ON/OFF states of the ON/OFF sensor group 103, magnitudes of a generated signal voltage of the analog sensor 104, and various control programs or control constants that are stored in the non-volatile memory 120.

A temperature in the neighborhood of the constant voltage power supply circuit section 111 during the operation of an actual device of an ECU 100a is measured with the temperature detection sensor 112b. However, individual fluctuation that the temperature detection sensor 112b, which is applied to a standard temperature detection sensor, possesses is calibrated in such a manner as shown in FIG. 5(A) or FIG. 5(B), thus enabling to obtain more accurate neighborhood temperatures.

On the other hand, although a constant voltage output Vcc from the constant voltage power supply circuit section 111 changes depending on temperature in the neighborhood of the constant voltage power supply circuit section, there is no means for directly reading values of the constant voltage output Vcc with the microprocessor 110a.

However, as shown in FIG. 3(A) or FIG. 3(B), using temperature versus output voltage characteristics of a standard constant voltage power supply circuit section and an output voltage of an article to be mounted that is measured with the voltage measuring instrument 203 at calibration temperature, it is possible to estimate a constant voltage output Vcc from the applied constant voltage power supply circuit section 111.

The constant voltage output Vcc from the constant voltage power supply circuit section 111 is applied to the analog sensor group 104 and used as a power supply voltage thereof. However, even if this analog sensor group 104 is comprised of ideal analog sensors that measure a desired physical quantity with accuracy despite the change in power supply voltages, a problem still exists in that digital converted value of the multi-channel AD converter 114 fluctuates due to the change in reference voltages thereof.

In this respect, as shown in FIG. 4, a compensation coefficient in accordance with a power supply voltage to be estimated is calculated, and an actually measured value is multiplied by this compensation coefficient, thereby enabling to detect a more accurate physical quantity.

With reference to FIG. 6 as to the heat-generation suppression control, the feedback control program 604 drives the motor 106 that controls an valve opening of the throttle valve 601 to execute the feedback control of a throttle valve opening so that a target throttle valve opening that is obtained as a result of a depression degree of the accelerator pedal to be detected with the accelerator position sensor 104a and the compensation made by the idle compensation block 602 and acceleration/deceleration compensation block 603 may be equal to a detected output from the throttle position sensor 104t.

Furthermore, fuel injection control means 630 feeds an electric power to the fuel injection solenoid valve 105f via the switching element 115f in synchronization with a detection angle of the crank angle sensor 103a and during a period conforming to an air-intake from the airflow sensor 104f and an oxygen concentration from the exhaust gas sensor 104g.

When a temperature in the neighborhood of the microprocessor 110a from CPU temperature estimation means 612a that operates on the basis of CPU temperature estimation reference data 610a and parameter data 611a exceeds a first threshold 613, error processing means 614 generates an error determination output to cause the alarm•display 107 to start operation, and a suppression voltage Vd becomes active to make suppression of a target throttle valve opening.

As a result, the engine speed and fuel supply duty are decreased, resulting in decrease of temperature rise of the switching element 115f, being a power transistor. When eventually an estimated temperature provided from the CPU temperature estimation means 612a comes to be not more than a second threshold, an error determination output from the error processing means 614 is reset.

The suppression of throttle valve opening operates when an engine speed that is detected by the engine speed detection means 620 exceeds a suppression threshold 621, and a suppression quantity is increased as the excess of engine speed is increased. However, when engine speed is not decreased but exceeds an upper limit threshold, e.g., at the time of going down on the steep hill, the fuel supply stop means 631 operates to stop driving the fuel injection solenoid valve.

The estimation of temperature in the neighborhood of the microprocessor 110a is made as shown in FIG. 7. The accurate estimation is made taking standard temperature characteristics 700, being temperatures in the neighborhood of the constant voltage power supply circuit section 111, standard temperature characteristics 701, being estimated temperatures in the neighborhood of the switching element 115f, and standard temperature characteristics 702, being estimated temperatures in the neighborhood of the microprocessor 110a corresponding to a fuel supply duty as reference data, and referring to parameter data such as detection output from the actual temperature sensor 112b and fuel supply duty, engine speed, or power supply voltage of the on-vehicle battery 101.

(3) Description of Features and Advantages of Embodiment 1

As is obvious from the foregoing descriptions, the on-vehicle electronic control unit 100a according to the first embodiment of the invention comprises a microprocessor 110a including a non-volatile memory 120 storing a control program and a control constant to be transferred and written via an external tool 109 and an operation processing RAM memory 121, and controls a throttle valve opening in response to a depression degree of an accelerator pedal, as well as controls a fuel injection quantity with respect to an engine responsive to an air-intake of mentioned throttle valve; and the mentioned on-vehicle electronic control unit 100a further comprises a constant voltage power supply circuit section 111, a temperature detection sensor 112b, and a multi-channel AD converter 114, and the mentioned non-volatile memory 120 further includes a calibration processing data 123, a conversion processing data 124, and a program acting as compensation operation means 125.

The mentioned constant voltage power supply circuit section 111 is a constant voltage control circuit section that is fed with an electric power from an on-vehicle battery 101 to generate a predetermined constant voltage output Vcc, and feeds an electric power to the mentioned microprocessor 110a, non-volatile memory 120, and RAM memory 121; and that feeds an electric power to an analog sensor group 104, e.g., an accelerator position sensor 104a functioning to detect a depression degree of an accelerator pedal, a throttle position sensor 104t functioning to detect a throttle valve opening, an airflow sensor 104f functioning to detect an air-intake of an engine, and an exhaust gas sensor 104g functioning to detect an oxygen concentration in an exhaust gas.

The mentioned temperature detection sensor 112b is comprised of a heat-sensitive element that is disposed in the neighborhood of the mentioned constant voltage power supply circuit section, and is fed with an electric power from this constant voltage power supply circuit section 111 to generate a temperature detection voltage responsive to a temperature in the neighborhood of the constant voltage power supply circuit section.

The mentioned multi-channel AD converter 114 is a conversion circuit element to which an output voltage from the mentioned analog sensor group 104 and temperature detection sensor 112b, which generates the maximum digital output of a predetermined resolution when an analog input voltage of an AD converter is equal to a reference voltage Vref that is supplied from the mentioned constant voltage power supply circuit section, and which selectively inputs to the mentioned microprocessor 110*a* digital converted values with respect to a large number of analog inputs.

The mentioned calibration processing data 123 is data of measurement results obtained by means of a measuring device 200 disposed externally and being transferred and written from the mentioned external tool 109 in adjustment operation stage of the mentioned on-vehicle electronic control unit 100*a*, and this calibration processing data 123 contains externally measured data as to a temperature in the neighborhood of the mentioned constant voltage power supply circuit section 111 to be estimated from an environmental temperature at a time point of adjustment operation, and an actual output voltage from the mentioned constant voltage power supply circuit section 111 at the time point of adjustment operation, as well as contains as a contrast data a temperature detection voltage of the mentioned temperature detection sensor 112*b* that is digital-converted with the mentioned multi-channel AD converter at the time point of adjustment operation.

The mentioned conversion processing data 124 contains an average voltage fluctuation characteristic data statistically calculated preliminarily by the actual measurement and determination for a large number of products as to fluctuation characteristics of a neighborhood temperature versus an output voltage of the mentioned constant voltage power supply circuit section; and the mentioned compensation operation means 125 is voltage estimation means for estimating an output voltage from the constant voltage power supply circuit section 111 under a different temperature environment by referring to a detection output from the mentioned temperature detection sensor 112*b*, the mentioned calibration processing data 123 and conversion processing data 124.

The mentioned conversion processing data 124 further contains an average detection fluctuation characteristic data statistically calculated preliminarily by the actual measurement and determination for a large number of sensors as to fluctuation characteristics of a power supply voltage versus a detection output voltage with respect to a part or all of analog signals to be inputted to the mentioned multi-channel AD converter; as well as the mentioned compensation operation means 125 further includes detected value compensation means for estimating an output voltage from a constant voltage power supply circuit section 111 under the different temperature environment by referring to a detection output from the mentioned temperature detection sensor 112*b* and the mentioned calibration processing data 123 and conversion processing data 124, and for obtaining a digital detection output having been compensated corresponding to an estimated output voltage and an input voltage of analog sensor.

As a result, it is possible to obtain a digital detection output having been compensated corresponding to an input voltage of the analog sensors even if output voltages from the constant voltage power supply circuit section 111 fluctuate with respect to the wide range of temperature change in the internal part of the electronic control unit, so that an advantage exists in that a constant voltage power supply circuit section 111 is arranged inexpensively.

With regard to the mentioned calibration processing data 123, an adjustment operation under high-temperature environment is applied to an environmental temperature at a time point of adjustment operation, in addition to the adjustment operation under the natural environment, and temperature characteristics of the mentioned temperature detection sensor 112*b* and constant voltage power supply circuit section 111 themselves that are contained in an actual article, being a target of adjustment operation, are measured and stored; and individual fluctuation in temperature characteristics is compensated in actual use.

As a result, even if temperature characteristics of the temperature detection sensor 112*b* or constant voltage power supply circuit section 111 having been applied is different from temperature characteristics of a standard temperature detection sensor or constant voltage power supply circuit section, an advantage exists in that a temperature detection in the neighborhood of the constant voltage power supply circuit section and an output voltage from the constant voltage power supply circuit section can be estimated depending on characteristics of the actual sensor or circuit section having been applied.

The on-vehicle electronic control unit 100*a* according to Embodiment 1 of the invention is such a type of on-vehicle electronic control unit as to comprise a microprocessor 110*a* including a non-volatile memory 120 storing a control program and a control constant to be transferred and written via an external tool 109, and an operation processing RAM memory 121, to control a throttle valve opening in response to a depression degree of an accelerator pedal, and to control a fuel injection quantity with respect to an engine responsive to an air-intake of the mentioned throttle valve, and to contain therein a power transistor, being a switching element 115*f* for driving a fuel injection solenoid valve 105*f*; the mentioned on-vehicle electronic control unit 100*a* further comprises a constant voltage power supply circuit section 111 and a temperature detection sensor 112*b*; and the mentioned non-volatile memory 120 further contains a CPU temperature estimation reference data 610*a*, a program acting as CPU temperature estimation means 612*a*, and a program acting as error processing means 614.

The mentioned constant voltage power supply circuit section 111 is a constant voltage control circuit section that is fed with an electric power from an on-vehicle battery 101 to generate a predetermined constant voltage output Vcc, and feeds an electric power to the mentioned microprocessor 110*a*, non-volatile memory 120, and RAM memory 121, and that feeds an electric power to an analog sensor group 104, e.g., an accelerator position sensor 104*a* functioning to detect a depression degree of an accelerator pedal, a throttle position sensor 104*t* functioning to detect a throttle valve opening, an airflow sensor 104*f* functioning to detect an air-intake of an engine, and an exhaust gas sensor 104*g* functioning to detect an oxygen concentration in an exhaust gas.

The mentioned temperature detection sensor 112*b* is comprised of a heat-sensitive element that is disposed in the neighborhood of the mentioned constant voltage power supply circuit section 111, and is fed with an electric power from this constant voltage power supply circuit section to generate a temperature detection voltage responsive to a temperature in the neighborhood of the constant voltage power supply circuit section; and from which an output voltage of the constant voltage power supply circuit section 111 is estimated.

The mentioned CPU temperature estimation reference data 610*a* is a data table or an approximation formula obtained preliminarily by actual measurement and determination of correlation characteristics as to a power supply voltage of the mentioned on-vehicle battery 101, an engine speed or a fuel supply ratio, being a ratio between power feed ON time period and power feed ON/OFF period with respect to a fuel injection solenoid valve, a temperature detection output from mentioned temperature detection sensor 112*b*, and a temperature around the mentioned microprocessor 110*a*.

The mentioned CPU temperature estimation means 612*a* is means for estimating an environmental temperature of the mentioned microprocessor 110*a* responsive to a temperature detection output from a temperature detection sensor 112*b* that is disposed in the neighborhood of the mentioned constant voltage power supply circuit section 111 by referring to the mentioned CPU temperature estimation reference data 610*a*; and the mentioned error processing means 614 is means that operates when a temperature estimated by the mentioned CPU temperature estimation means 612*a* is excessively large, and at least makes error notification.

As a result, it is possible to estimate a temperature around the microprocessor 110*a* with accuracy by using the temperature detection sensor 112*b* that is disposed at the constant voltage power supply circuit section 111, so that an advantage exists in that a temperature detection sensor of the microprocessor 110*a* itself can be omitted resulting in inexpensive cost, and that the number of analog signals to be inputted to the multi-channel AD converter 114 can be reduced.

The mentioned error processing means 614 further includes a hysteresis function; and an error determination output from the mentioned error processing means 614 is operated when a temperature estimated by mentioned CPU temperature estimation means 612*a* exceeds a first threshold 613, and is reset when the mentioned estimated temperature comes to be not more than a second threshold, being a value smaller than the mentioned first threshold.

As a result, although the temperature around the microprocessor 110*a* tends to change being delayed as compared with heating portions of the constant voltage power supply circuit section 111, a power transistor, being the load driving switching element 115*f*, or the like, it is arranged such that error is reset after the sufficient temperature decrease and restoration once the error notification has been made. Thus, there is an advantage of improvement in safety.

A program, acting as the mentioned error processing means 614 further includes a program acting as heat-generation suppression means 622; this heat-generation suppression means 622 is means that operates when the mentioned error processing means 614 generates an error notification output, as well as when an engine speed exceeds a predetermine suppression threshold 621, and that reduces a target throttle valve opening that corresponds to a depression degree of the accelerator pedal as an excess of engine speed is increased; and the mentioned heat-generation suppression means 622 suppresses the increase in electric power consumption of a switching element due to rise in conduction rate, being a ratio between ON time period and ON/OFF period of the mentioned switching element 115*f* as an engine speed is increased.

As a result, the error processing means 614 not merely makes error notification, but also carries out heat-generation suppression of the microprocessor 110*a*, so that an advantage exists in that the electronic control unit 100*a* can be prevented from burnout and deterioration thereof.

Further, since the heat-generation suppression is to suppress a target throttle valve opening, a further advantage exists in that a safe driving can be continued even after the occurrence of error.

The mentioned on-vehicle electronic control unit 100*a* is of a type of containing therein a power transistor, being a switching element 115*f* for driving a fuel injection solenoid valve 105*f*, and a program acting as the mentioned error processing means 614 further includes a program acting as fuel supply stop means 631; and the mentioned fuel supply stop means 631 is means for stopping driving a fuel injection solenoid valve 105*f* to suppress the heat generation of the mentioned switching element 115*f* when the mentioned error processing means 614 generates an error notification output and when an engine speed exceeds a predetermined upper limit value larger than an engine speed at which the gradual decrease is started by the mentioned heat-generation suppression means 622.

As a result, an advantage exists in that an engine speed can be suppressed by operation of an engine brake to the utmost at the time of going down on the steep hill when an engine speed is not decreased even if a target throttle valve opening is suppressed. A further advantage exists in that the heat generation of a power transistor, being a switching element, can be reliably suppressed even if an engine speed is not sufficiently decreased at the time of going down on the steep hill.

Embodiment 2

Figure 8:
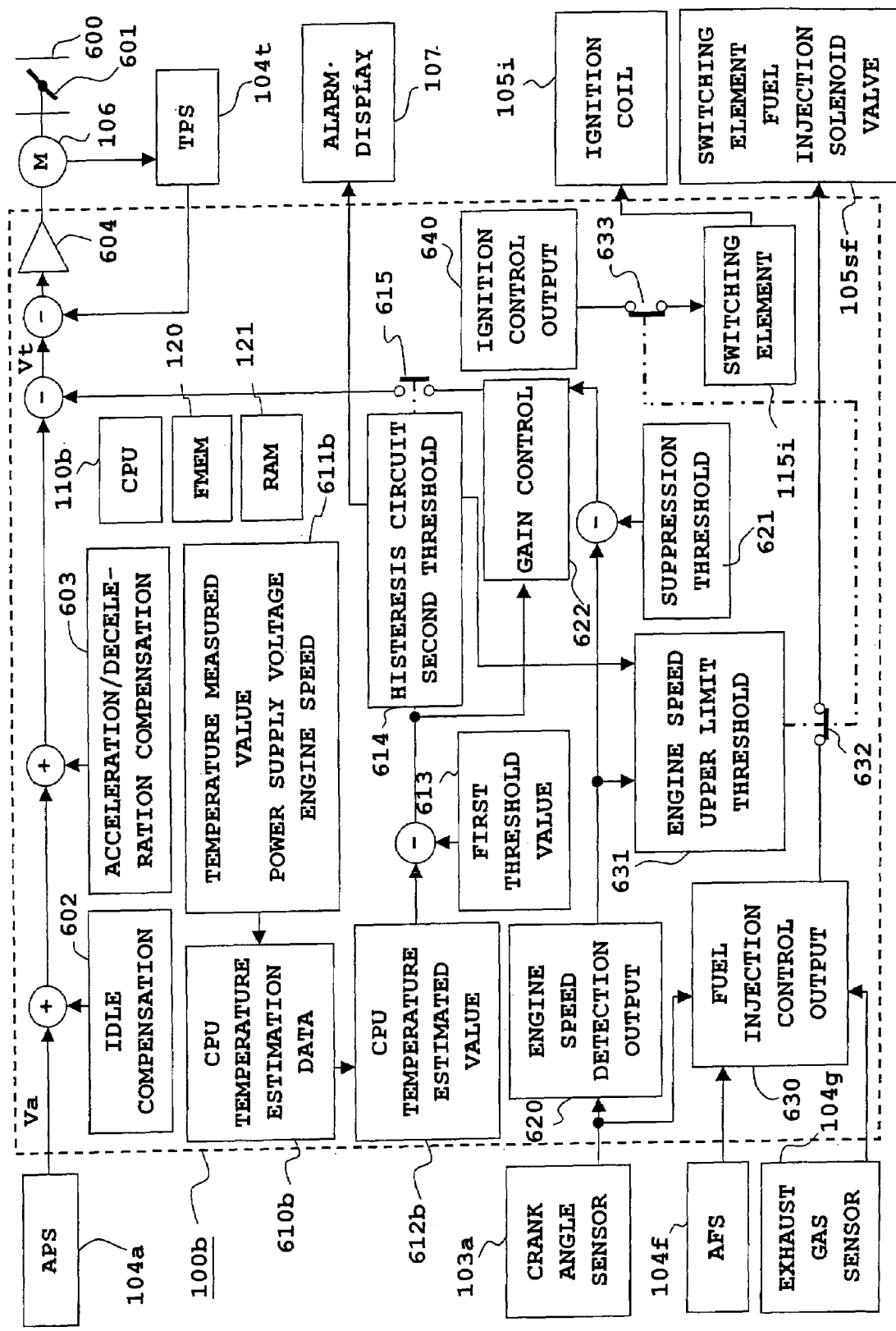
FIG. 8 is a block diagram of heat generation suppression control of an on-vehicle electronic control unit according to a second embodiment of the invention.

FIG. 8 showing a block diagram of heat-generation suppression control of a second embodiment device according to the invention is hereinafter described with a focus on points different from that of FIG. 6.

In additiion, the entire arrangement of an on-vehicle electronic control unit 100*b* according to the second embodiment is the same as that shown in FIG. 1.

With reference to FIG. 8, an on-vehicle electronic control unit (ECU) 100*b* to be controlled by a microprocessor 110*b* contains therein no power transistor, being a driving switching element with respect to a fuel injection solenoid valve. This power transistor is mounted outside of the ECU 100*b*.

Further, ignition control means 640 feeds an electric power to an ignition coil 105*i* via a switching element 115*i*, being a power transistor contained in the ECU 100*b*.

Thus, CPU temperature estimation means 612*b* operates on the basis of CPU temperature estimation reference data 610*b* and parameter data 611*b*. However, this parameter data 611*b* includes no information regarding a fuel supply duty, and an electric power consumption of the switching element 115*i* is estimated based on engine speed information.

Figure 9:
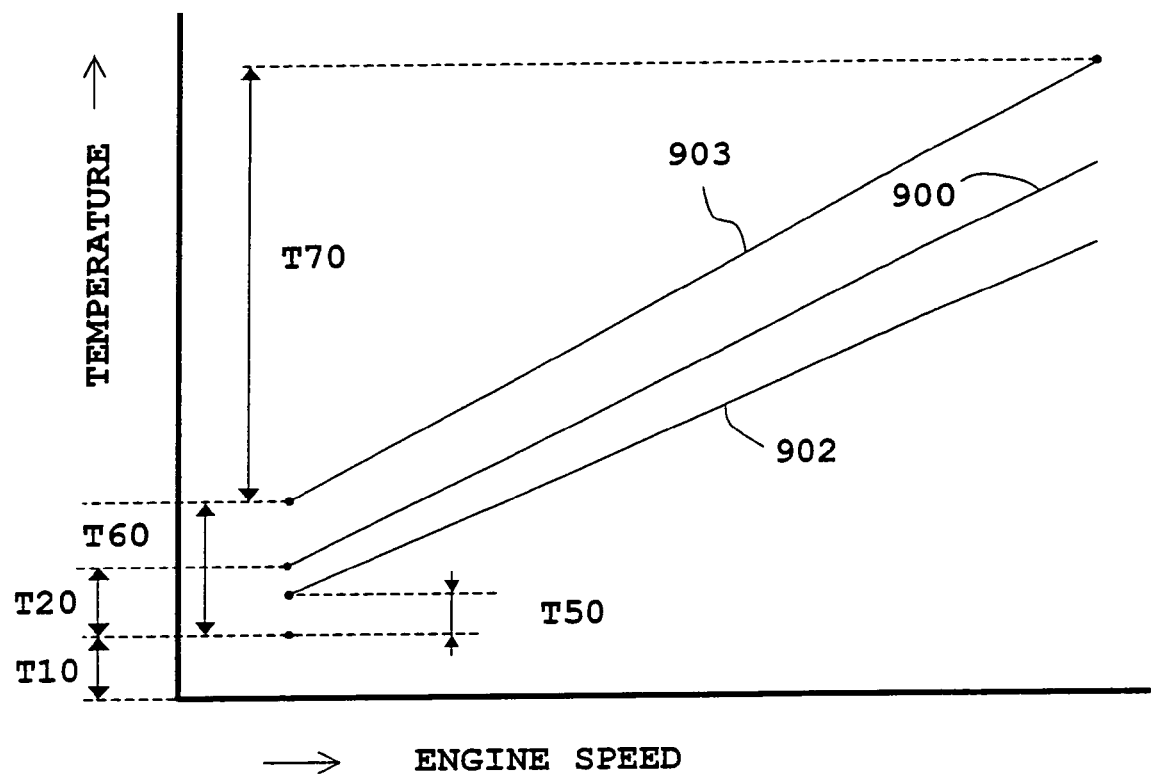
FIG. 9 is an explanatory characteristic chart of the control unit of FIG. 8.

With reference to FIG. 9, being an explanatory characteristic chart of FIG. 8, the axis of abscissas indicates engine speeds, and the axis of ordinates indicates temperatures. Temperatures in the neighborhood of the constant voltage power supply circuit section 111 to be measured by means of a temperature detection sensor 112*b* are indicated with a temperature characteristic 900, estimated temperatures in the neighborhood of the switching element 115*i* are indicated with a temperature characteristic 903, and temperatures in the neighborhood of the microprocessor 110*b* that are estimated by CPU temperature estimation means 612*b* are indicated with a temperature characteristic 902.

The minimum temperature T10 is a temperature in the neighborhood of the constant voltage power supply circuit section 111 when an engine speed N is in the minimum state, and further a voltage of the on-vehicle battery 101 is a permitted minimum value. This minimum temperature T10 largely depends on an environmental atmospheric temperature, and is a temperature to which temperature rise owing to the other unspecified electric power consumption in the ECU 100*b* is added.

A first addition temperature T20 largely depends on an electric power consumption of the constant voltage power supply circuit section 111 that is determined depending on values of a power supply voltage Vb of the on-vehicle battery 101 and an output current from the constant voltage power supply circuit section 111, and is a temperature to which the other effect of an electric power consumption of the switching element 115i is added.

A second addition temperature T60 largely depends on an electric power consumption of the switching element 115i that is determined depending on an engine speed N, and is a temperature to which the other effect of an electric power consumption of the constant voltage power supply circuit section 111.

A third addition temperature T70 is correspondent to temperature rise of the switching element 115i that depends on an electric power consumption of the switching element 115i when an engine speed N is the maximum.

A fourth addition temperature T50 is correspondent to temperature rise obtained by addition of the effects of an electric power consumption of the microprocessor 110b and an electric power consumption of the constant voltage power supply circuit section 111 or the switching element 115i.

In this manner, on condition that standard temperature characteristics 900•903•902 are measured and stored, temperatures in the neighborhood of the microprocessor 110b at an actual power supply voltage Vb, or an engine speed N can be estimated and operated with high accuracy.

To calculate with accuracy an electric power consumption of the constant voltage power supply circuit section 111, a voltage of the on-vehicle battery 101 and a load current of the constant voltage power supply circuit section 111 just have to be made clear. In the case where detection output of a load current cannot be obtained, the estimation can be made with an average load current.

Primary factors to determine an electric power consumption of the switching element 115i are an engine speed N. However, even if this factor is changed, temperatures of the switching element 115i are not sharply changed, and a response delay owing to a thermal time constant τ of the switching element 115i occurs.

Accordingly, an electric power consumption that is calculated with an engine speed N is moving-averaged and used, and the temperature rise of the switching element 115i is estimated with an average value of a time period from the current time to the past timer τ.

The temperature rise of the constant voltage power supply circuit section 111 goes in the same manner.

The on-vehicle electronic control unit 100b according to the second embodiment of the invention is of such a type as to comprise a microprocessor 110b including a non-volatile memory 120 storing a control program and a control constant to be transferred and written via an external tool, and an operation processing RAM memory 121, to control a throttle valve opening in response to a depression degree of an accelerator pedal, as well as to control a fuel injection quantity with respect to an engine responsive to an air-intake of the mentioned throttle valve, and to contain therein a power transistor, being an ignition coil driving switching element 115i; the mentioned on-vehicle electronic control unit 100b further comprises a constant voltage power supply circuit section 111 and a temperature detection sensor 112b; and the mentioned non-volatile memory 120 further contains a CPU temperature estimation reference data 610b, a program acting as CPU temperature estimation means 612b, and a program acting as error processing means 614b.

The mentioned constant voltage power supply circuit section 111 is a constant voltage control circuit section that is fed with an electric power from an on-vehicle battery 101 to generate a predetermined constant voltage output Vcc, and feeds an electric power to the mentioned microprocessor 110b, non-volatile memory 120, and RAM memory 121, and that feeds an electric power to an analog sensor group 104g, e.g., an accelerator position sensor 104a functioning to detect a depression degree of an accelerator pedal, a throttle position sensor 104t functioning to detect a throttle valve opening, an airflow sensor 104f functioning to detect an air-intake of an engine, and an exhaust gas sensor 104g functioning to detect an oxygen concentration in an exhaust gas.

The mentioned temperature detection sensor 112b is comprised of a heat-sensitive element that is disposed in the neighborhood of the mentioned constant voltage power supply circuit section 111, and is fed with an electric power from this constant voltage power supply circuit section to generate a temperature detection voltage responsive to a temperature in the neighborhood of the constant voltage power supply circuit section, from which an output voltage of the constant voltage power supply circuit section 111 is estimated.

The mentioned CPU temperature estimation reference data 610a is a data table or an approximation formula obtained preliminarily by actual measurement and determination of correlation characteristics as to a power supply voltage of the mentioned on-vehicle battery 101, an engine speed, a temperature detection output from the mentioned temperature detection sensor 112b, and a temperature around the mentioned microprocessor; mentioned CPU temperature estimation means 612b is means for estimating an environmental temperature of the mentioned microprocessor 100b responsive to a temperature detection output from a temperature detection sensor 112b that is disposed in the neighborhood of the mentioned constant voltage power supply circuit section 111 by referring to the mentioned CPU temperature estimation reference data 610b; and the mentioned error processing means 614 is means that operates when a temperature estimated by the mentioned CPU temperature estimation means 612a is excessively large, and at least makes error notification.

As a result, it is possible to estimate a temperature around the microprocessor 110b with accuracy by using the temperature detection sensor 112b that is disposed at the constant voltage power supply circuit section 111, so that an advantage exists in that a temperature detection sensor of the microprocessor 110b itself can be omitted resulting in inexpensive cost, and that the number of analog signals to be input to the multi-channel AD converter 114 can be reduced.

The mentioned error processing means 614 further includes a hysteresis function; and an error determination output from the mentioned error processing means 614 is operated when a temperature estimated by the mentioned CPU temperature estimation means 612b exceeds a first threshold 613, and is reset when the mentioned estimated temperature comes to be not more than a second threshold, being a value smaller than mentioned first threshold 613.

As a result, although the temperature around the microprocessor 110b tends to change being delayed as compared with heating portions of the constant voltage power supply circuit section 111, a power transistor, being the load driving switching element 115i, or the like, it is arranged such that error is reset after the sufficient temperature decrease and restoration once the error notification has been made. Thus, there is an advantage of improvement in safety.

A program, acting as the mentioned error processing means 614 further includes a program acting as heat-generation suppression means 622;

this heat-generation suppression means 622 is means that operates when the mentioned error processing means 614 generates an error notification output and when an engine speed exceeds a predetermine suppression threshold 621, and that reduces a target throttle valve opening that corresponds to a depression degree of the accelerator pedal as an excess of engine speed is increased; and the mentioned heat-generation suppression means 622 suppresses the increase of an electric power consumption of a switching element 115*i* due to rise in conduction rate, being a ratio between ON time period and ON/OFF period of mentioned switching element 115*i* as an engine speed is increased.

As a result, error processing means 614 not merely makes the error notification, but also carries out the heat-generation suppression of the microprocessor 110*b*, so that an advantage exists in that the electronic control unit 100*b* can be prevented from burnout and deterioration thereof.

Further, since the heat-generation suppression is to suppress a target throttle valve opening, a further advantage exists in that a safe driving can be continued even after the occurrence of error.

The mentioned on-vehicle electronic control unit 100*b* is of a type of containing therein a power transistor, being an ignition coil driving switching element 115*i*, and a program acting as the mentioned error processing means 614 further includes programs acting as fuel supply stop means 631 and ignition control stop means 633;

the mentioned fuel supply stop means 631 is means that operates and stops driving a fuel injection solenoid valve when the mentioned error processing means 614 generates an error notification output and when an engine speed exceeds a predetermined upper limit value larger than an engine speed at which gradual decrease in speed is started by the mentioned heat-generation suppression means 622; and the mentioned ignition control stop means 633 is means that operates, and causes a power transistor, being an ignition coil driving switching element 115*i* to be in an open circuit to suppress heat generation when the mentioned fuel supply stop means 631 stops driving a fuel injection solenoid valve.

As a result, an advantage exists in that engine speed can be suppressed by operation of an engine brake to the utmost at the time of going down on the steep hill when an engine speed is not decreased even if a target throttle valve opening is suppressed. A further advantage exists in that the heat generation of a power transistor, being a switching element, can be reliably suppressed even if an engine speed is not sufficiently decreased at the time of going down on the steep hill.

Embodiment 3

Figure 10:
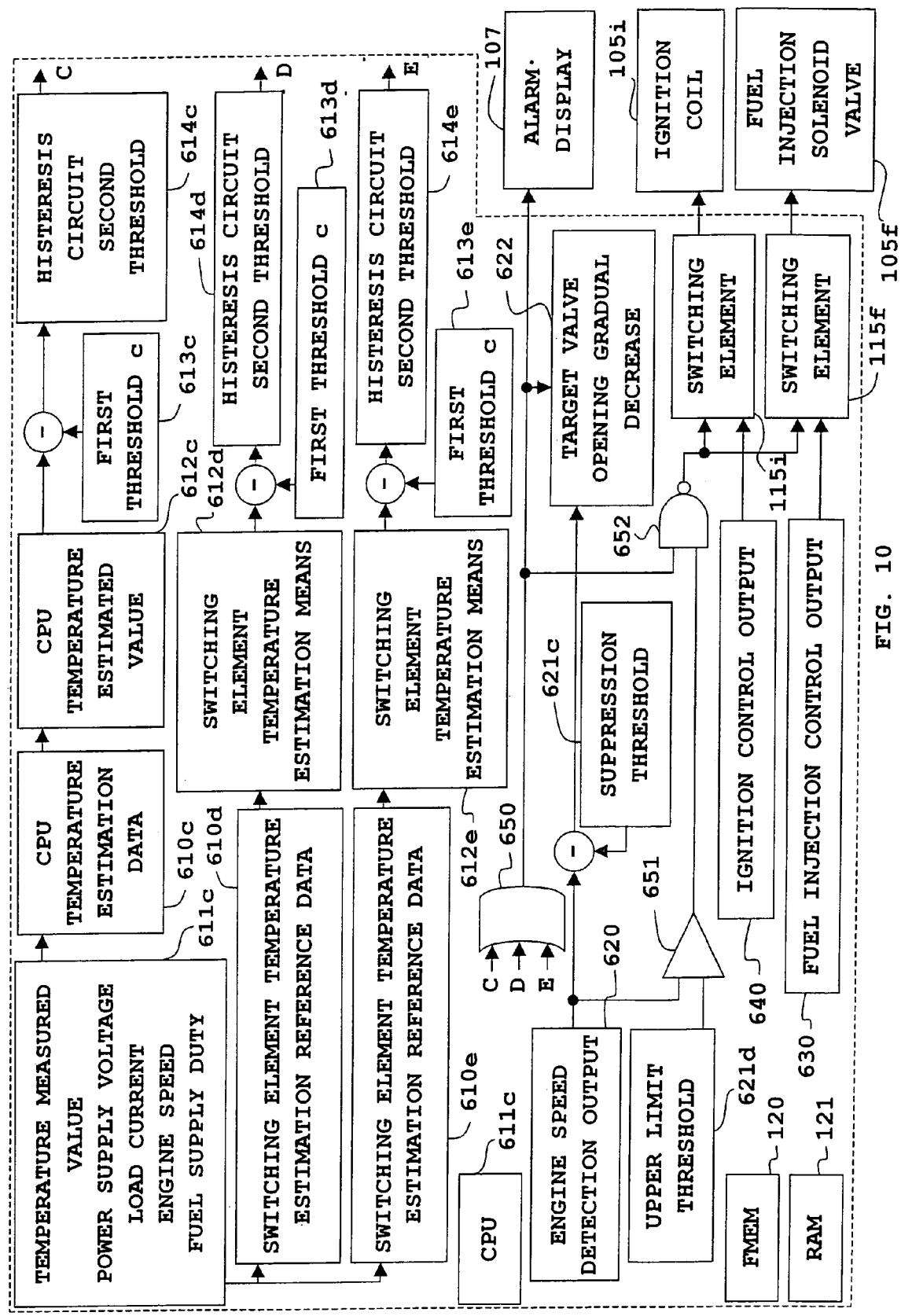
FIG. 10 is a block diagram of heat generation suppression control of a third electronic control unit according to a third embodiment of the invention.

FIG. 10 showing a block diagram of heat-generation suppression control of a third embodiment device of the invention is hereinafter described.

In addition, the entire arrangement of an on-vehicle electronic control unit 100*c* according to the third embodiment is the same as that shown in FIG. 1.

With reference to FIG. 10, an on-vehicle electronic control unit (ECU) 100*c* to be controlled by a microprocessor 110*c* contains therein a power transistor, being a driving switching element 115*f* with respect to a fuel injection solenoid valve 105*f*, and a power transistor, being a driving switching element 115*i* with respect to an ignition coil 105*i*. This on-vehicle electronic control unit carries out switching control of the switching elements 115*f*•115*i* with fuel injection control means 630 and ignition control means 640.

Parameter data 611*c* includes a measured temperature value in the neighborhood of the constant voltage power supply circuit section 111 obtained by a temperature detection sensor 112*b*, a power supply voltage of the on-vehicle battery 101, a load current of the constant voltage power supply circuit section 111, an engine speed, and a fuel supply duty.

CPU temperature estimation means 612*c* estimates a temperature in the neighborhood of the microprocessor 110*c* on the basis of CPU temperature estimation reference data 610*c* and parameter data 611*c*. When this estimated temperature exceeds a first threshold 613*c*, error processing means 614*c* generates an error determination output C. When the mentioned estimated temperature comes to be not more than a second threshold, being a value smaller than the first threshold 613*c*, an error determination output C is reset.

Switching element temperature estimation means 612*d* estimates temperatures in the neighborhood of the switching element 115*f* on the basis of switching element temperature estimation reference data 610*d* and parameter data 611*c*. When this estimated temperature exceeds a first threshold 613*d*, error processing means 614*d* generates an error determination output D. When the above-mentioned estimated temperature comes to be not more than a second threshold value, being a value smaller than the first threshold 613*d*, an error determination output D is reset.

Switching element temperature estimation means 612*e* estimates a temperature in the neighborhood of the switching element 115*i* on the basis of switching element temperature estimation reference data 610*e* and parameter data 611*c*. When this estimated temperature exceeds a first threshold 613*e*, error processing means 614*e* generates an error determination output E. When the mentioned estimated temperature comes to be not more than a second threshold, being a value smaller than the first threshold 613*e*, an error determination output E is reset.

An OR element 650 brings the alarm•display 107 in operation with an error notification output, being an OR output of error determination outputs C•D•E.

Heat-generation suppression means 622 is means that operates when the OR element 650 outputs an error notification output and when an engine speed that is detected by engine speed detection means 620 exceeds a suppression threshold 621*c*, and that reduces a target throttle valve opening as an excess of engine speed is increased.

Furthermore, fuel supply stop means 652, being an Nand output element, operates when the OR element 650 generates an error notification output and when an engine speed that is detected by engine speed detection means 620 exceeds an upper limit threshold 621*d*, being a value larger than a suppression threshold 621*c*, and stops the operation of the switching element 115*f* and the switching element 115*i* to stop the power feed to the fuel injection solenoid valve 105*f* and the ignition coil 105*i*.

In addition, a comparison element 651 is arranged so that a logic level comes to be "H" when the engine speed that is detected by engine speed detection means 620 exceeds an upper limit threshold 621*d*.

The on-vehicle electronic control unit 100*c* according to the third embodiment of the invention is of such a type as to comprise a microprocessor 110*c* including a non-volatile memory 120 storing a control program and a control constant to be transferred and written via an external tool, and an operation processing RAM memory 121, to control a throttle valve opening in response to a depression degree of an accelerator pedal, as well as to control a fuel injection quantity with respect to an engine responsive to an air-intake of the mentioned throttle valve, and to contain therein power transistors of both a driving switching element 115*i* of an ignition coil 105*i* and a driving switching element 115*f* of a fuel injection solenoid valve 105*f*; the mentioned on-vehicle electronic control unit 100*c* further comprises a constant voltage power supply circuit section 111 and a temperature detection sensor 112*b*; and the mentioned non-volatile memory 120 further contains a CPU temperature estimation reference data 610*c*, a program acting as CPU temperature estimation means 612*c*, and a program acting as error processing means 614*c*.

The mentioned constant voltage power supply circuit section 111 is a constant voltage control circuit section that is fed with an electric power from an on-vehicle battery 101 to generate a predetermined constant voltage output Vcc, and feeds an electric power to the mentioned microprocessor 110*c*, non-volatile memory 120, and RAM memory 121, and that feeds an electric power to an analog sensor group 104*g*, e.g., an accelerator position sensor 104*a* functioning to detect a depression degree of an accelerator pedal, a throttle position sensor 104*t* functioning to detect a throttle valve opening, an airflow sensor 104*f* functioning to detect an air-intake of an engine, and an exhaust gas sensor 104*g* functioning to detect an oxygen concentration in an exhaust gas.

The mentioned temperature detection sensor 112*b* is comprised of a heat-sensitive element that is disposed in the neighborhood of mentioned constant voltage power supply circuit section 111; and is fed with an electric power from this constant voltage power supply circuit section to generate a temperature detection voltage responsive to a temperature in the neighborhood of the constant voltage power supply circuit section, from which an output voltage of the constant voltage power supply circuit section 111 is estimated.

The mentioned CPU temperature estimation reference data 610*c* is a data table or an approximation formula obtained preliminarily by actual measurement and determination of correlation characteristics as to a power supply voltage of the mentioned on-vehicle battery 101, an engine speed or a fuel supply ratio, being a ratio between power feed ON time period and power feed ON/OFF period with respect to a fuel injection solenoid valve, a temperature detection output from the mentioned temperature detection sensor 112*b*, and a temperature around the mentioned microprocessor.

The mentioned CPU temperature estimation means 612*c* is means for estimating an environmental temperature of the mentioned microprocessor 110*c* responsive to a temperature detection output from a temperature detection sensor 112*b* that is disposed in the neighborhood of the mentioned constant voltage power supply circuit section 111 by referring to the mentioned CPU temperature estimation reference data 610*c*.

The mentioned error processing means 614*c* is means that operates when a temperature estimated by the mentioned CPU temperature estimation means 612*c* is excessively large, and at least makes error notification.

As a result, it is possible to estimate a temperature around the microprocessor 110*c* with accuracy by using the temperature detection sensor 112*b* that is disposed at the constant voltage power supply circuit section 111, so that an advantage exists in that a temperature detection sensor of the microprocessor 110*c* itself can be omitted resulting in inexpensive cost, and that the number of analog signals to be input to the multi-channel AD converter 114 can be reduced.

The mentioned non-volatile memory 120 further contains switching element temperature estimation reference data 610*d*, 610*e*, a program acting as switching element temperature estimation means 612*d*, 612*e*, and a program acting as error processing means 614*d*, 614*e*. The mentioned switching element temperature estimation reference data 610*d*, 610*e* is data tables or approximation formulas obtained preliminarily by actual measurement and determination of correlation characteristics as to a power supply voltage of the mentioned on-vehicle battery, an engine speed or a fuel supply ratio, being a ratio between power feed ON time period and power feed ON/OFF period with respect to a fuel injection solenoid valve, a detection output from the mentioned temperature detection sensor 112*b*, and a temperature around a power transistor, being the mentioned switching elements 115*f*, 115*i*.

The mentioned switching element temperature estimation means 612*d*, 612*e* is means for estimating an environmental temperature of a power transistor, being the mentioned switching element 115*f*, 115*i*, responsive to a temperature detection output from a temperature detection sensor 112*b* that is disposed in the neighborhood of the mentioned constant voltage power supply circuit section 111 by referring to the mentioned switching element temperature estimation reference data 610*d*, 610*e*.

The mentioned error processing means 614*d*, 614*e* is means that operates when a temperature estimated by mentioned CPU temperature estimation means 612*c* is excessively large and when a temperature estimated by the mentioned switching element temperature estimation means 612*d*, 612*e* is excessively large, and at least make error notification.

As a result, it is possible to estimate temperatures around a power transistor, being switching element 115*f*, 115*i*, with accuracy by using the temperature detection sensor 112*b* that is disposed at the constant voltage power supply circuit section 111, so that an advantage exists in that a temperature detection sensor of a power transistor itself can be omitted resulting in inexpensive cost, and that the number of analog signals to be input to the multi-channel AD converter 114 can be reduced.

A load current detected value of the mentioned constant voltage power supply circuit section 111 is added to correlation characteristic factors in the mentioned CPU temperature estimation reference data 610*c* or switching element temperature estimation reference data 610*d*, 610*e*, and self-heating of the constant voltage power supply circuit section 111 is estimated with a power supply voltage of the mentioned on-vehicle battery and mentioned load current; self-heating of a power transistor, being the mentioned switching element 115*f*, 115*i* is estimated with the mentioned engine speed or fuel ratio with respect to a fuel injection solenoid valve; and a CPU temperature or a switching element temperature is estimated in combination with an atmospheric environmental temperature contained in a temperature detection output from the mentioned temperature detection sensor 112*b*. The estimation and operation means with each of the mentioned data is temperature rise operation means employed in the invention.

As a result, it is possible to estimate with accuracy the self-heating of the constant voltage power supply circuit section 111 despite the change in load of the constant voltage power supply circuit section 111, so that an advantage exists in that accuracy of the estimation and operation of temperatures around the microprocessor 110c or the power transistor is improved.

The mentioned error processing means 614c, 614d, 614e further includes a hysteresis function; and an error determination output from the mentioned error processing means 614c, 614d, 614e is operated when a temperature estimated by the mentioned CPU temperature estimation means 612c or switching element temperature estimation means 612d, 612e exceeds first threshold 613c, 613d, 613e, and is reset when the mentioned estimated temperature comes to be not more than a second threshold, being a value smaller than the mentioned first threshold.

As a result, although the temperature around the microprocessor 110c tends to change being delayed as compared with heating portions of the constant voltage power supply circuit section 111, a power transistor, being the load driving switching element 115f, 115i or the like, it is arranged such that error is reset after the sufficient temperature decrease and restoration once the error notification has been made. Thus, there is an advantage of improvement in safety.

A program, acting as the mentioned error processing means 614c, 614d, 614e further includes a program acting as heat-generation suppression means 622.

The mentioned heat-generation suppression means 622 is means that operates when the mentioned error processing means 614c, 614d, 614e generates an error notification output and when an engine speed exceeds a predetermine suppression threshold 621c, and that reduces a target throttle valve opening that corresponds to a depression degree of the accelerator pedal as an excess of engine speed is increased; and the mentioned heat-generation suppression means 622 suppresses the increase in electric power consumption of a switching element due to rise in conduction rate, being a ratio between ON time period and ON/OFF period of the mentioned switching element 115f, 115i, as an engine speed is increased.

As a result, the error processing means 614c, 614d, 614e not merely makes the error notification but also carries out the heat-generation suppression of the microprocessor 110b, so that an advantage exists in that the electronic control unit 100c can be prevented from burnout and deterioration thereof.

Further, since the heat-generation suppression is to suppress a target throttle valve opening, a further advantage exists in that a safe driving can be continued even after the occurrence of error.

The mentioned on-vehicle electronic control unit 100c is of a type of containing therein a power transistor, being a driving switching element 115f of a fuel injection solenoid valve 105f, and a program acting as mentioned error processing means 614c, 614d, 614e further includes a program acting as fuel supply stop means 652.

The mentioned fuel supply stop means is means that operates and stops driving an ignition coil 105i or a fuel injection solenoid valve 105f to suppress the heat generation of the mentioned switching element 115i, 115f when the mentioned error processing means 614c, 614d, 614e generates an error notification output and when an engine speed exceeds a predetermined upper limit value 621d larger than an engine speed at which gradual decrease is started by the mentioned heat-generation suppression means 622.

As a result, an advantage exists in that an engine speed can be suppressed by operation of an engine brake to the utmost at the time of going down on the steep hill when an engine speed is not decreased even if a target throttle valve opening is suppressed. A further advantage exists in that the heat generation of a power transistor, being a switching element can be reliably suppressed even if an engine speed is not sufficiently decreased at the time of going down on the steep hill.

The mentioned on-vehicle electronic control unit 100c is of a type of containing therein a power transistor, being a driving switching element 115i of an ignition coil 105i, and a program acting as the mentioned error processing means 614c, 614d, 614e further includes programs acting as fuel supply stop means 652 and ignition control stop means 652.

The mentioned fuel supply stop means 652 is means that operates and stops driving a fuel injection solenoid valve 105f when the mentioned error processing means 614c, 614d, 614e generates an error notification output and when an engine speed exceeds a predetermined upper limit value 621d larger than an engine speed at which gradual decrease is started by the mentioned heat-generation suppression means 622.

The mentioned ignition control stop means 652 is means that operates, and causes a power transistor, being a driving switching element 115i of an ignition coil 105i, to be in an open circuit to suppress heat generation when the mentioned fuel supply stop means 652 stops driving a fuel injection solenoid valve 105f.

As a result, an advantage exists in that an engine speed can be suppressed by operation of an engine brake to the utmost at the time of going down on the steep hill when an engine speed is not decreased even if a target throttle valve opening is suppressed. A further advantage exists in that the heat generation of a power transistor, being a switching element, can be reliably suppressed even if an engine speed is not sufficiently decreased at the time of going down on the steep hill, and that there is no exhaust of dirty gas.

An on-vehicle electronic control unit according to the invention is described as a unit for controlling an engine of vehicles in the section describing the technical field. However, this on-vehicle electronic control unit is not limited to vehicles, but can be used for control of any engine that is mounted on ship, aircraft, and the other moving body, or an engine that is fixed and installed on the ground. Furthermore, the invention is not limited to the control of an engine, but also is applicable to various electronic measuring instruments and apparatus, particularly to instruments and apparatus to which electronic measuring technique employing an A/D converter is applied, for example, a fake bill determination circuit of vending machines or ATMs, thereby enabling to contribute to improvement in determination accuracy.

While the presently preferred embodiments of the present invention have been shown and described. It is to be understood that these disclosures are for the purpose of illustration and that various changes and modifications may be made without departing from the scope of the invention as set forth in the appended claims.

What is claimed is:

1. An on-vehicle electronic control unit that comprises a microprocessor including a non-volatile memory storing a control program and a control constant to be transferred and written via an external tool, and an operation processing RAM memory;
    said on-vehicle electronic control unit further comprises a constant voltage power supply circuit section, a temperature detection sensor, and a multi-channel AD converter, as well as said non-volatile memory further contains a calibration processing data, a conversion processing data, and a program acting as compensation operation means;

said constant voltage power supply circuit section is fed with an electric power from an on-vehicle battery to generate a predetermined constant voltage output, and feeds an electric power to said microprocessor, non-volatile memory, RAM memory, multi-channel AD converter, and an analog sensor group that is connected to said multi-channel AD converter;

said temperature detection sensor is constructed of a heat-sensitive element that is disposed in the neighborhood of said constant voltage power supply circuit section, and is fed with an electric power from said constant voltage power supply circuit section to generate a temperature detection voltage responsive to a temperature in the neighborhood of the constant voltage power supply circuit section;

said multi-channel AD converter is a conversion circuit element to which an output voltage from said analog sensor group and temperature detection sensor, which generates the maximum digital output of a predetermined resolution when an analog input voltage of an AD converter is equal to a reference voltage that is supplied from said constant voltage power supply circuit section, and which selectively inputs to said microprocessor digital converted values with respect to a large number of analog inputs;

said calibration processing data is data of measurement results obtained by means of a measuring device externally disposed being transferred and written from said external tool in adjustment operation stage of said on-vehicle electronic control unit, and said calibration processing data contains external measured data as to a temperature in the neighborhood of said constant voltage power supply circuit section to be estimated from an environmental temperature at a time point of adjustment operation, and an actual output voltage from said constant voltage power supply circuit section at a time point of adjustment operation, as well as contains as a contrast data a temperature detection voltage of said temperature detection sensor that is digital-converted with said multi-channel AD converter at a time point of adjustment operation;

said conversion processing data contains an average detection fluctuation characteristic data statistically calculated preliminarily by the actual measurement and determination for a large number of sensors as to fluctuation characteristics of a power supply voltage versus a detection output voltage of a part or all of the analog signals to be inputted to said multi-channel AD converter;

said voltage estimation means is means for estimating an output voltage from a constant voltage power supply circuit section under a different temperature environment based on a detection output from said temperature detection sensor and said calibration processing; and said compensation operation means is detection value compensation means for compensating at least a part of the values of the digital conversion voltage converted by said multi-channel AD converter based on the output voltage from the constant voltage power supply circuit section estimated by said voltage estimation means, and said conversion processing data.

2. The on-vehicle electronic control unit according to claim 1, wherein said analog sensor group to which an electric power is fed from said constant voltage circuit section comprises various types of analog sensors for use in on-vehicle engine control including an accelerator position sensor functioning to detect a depression degree of an accelerator pedal, a throttle position sensor functioning to detect a throttle valve opening, an airflow sensor functioning to detect an air-intake of an engine, and an exhaust gas sensor functioning to detect an oxygen concentration in an exhaust gas.

3. The on-vehicle electronic control unit according to claim 1, wherein said conversion processing data further contains an average detection fluctuation characteristic data statistically calculated preliminarily by the actual measurement and determination for a large number of sensors as to fluctuation characteristics of a power supply voltage versus a detection output voltage as to a part or all of analog signals to be input to said multi-channel AD converter;

as well as said compensation operation means further includes detected value compensation means for estimating an output voltage from a constant voltage power supply circuit section under a different temperature environment by referring to a detection output from said temperature detection sensor and said calibration processing data and conversion processing data, and for obtaining a digital detection output that is compensated corresponding to an estimated output voltage and an input voltage of analog sensor.

4. The on-vehicle electronic control unit according to claim 1, wherein with regard to said calibration processing data, as an environmental temperature at a time point of adjustment operation, the adjustment operation under high-temperature environment is added to the adjustment operation under natural environment, and temperature characteristics of said temperature detection sensor and constant voltage power supply circuit section themselves that are contained in an actual article, being a target of adjustment operation, are measured and stored; and individual fluctuations as to temperature characteristics are compensated to be used.

5. An on-vehicle electronic control unit that comprises a microprocessor including a non-volatile memory storing a control program and a control constant to be transferred and written via an external tool, and an operation processing RAM memory;

said on-vehicle electronic control unit further comprises a plurality of power transistors that make switching control of a current of an on-vehicle electric load group, a constant voltage power supply circuit section, and a temperature detection sensor;

said non-volatile memory further contains a CPU temperature estimation reference data, a program acting as CPU temperature estimation means, and a program acting as error processing means;

said constant voltage power supply circuit section is fed with an electric power from an on-vehicle battery to generate a predetermined constant voltage output, and feeds an electric power to said microprocessor, non-volatile memory, RAM memory; multi-channel AD converter, and an analog sensor group that is connected to said multi-channel AD converter;

said temperature detection sensor is constructed of a heat-sensitive element that is disposed in the neighborhood of said constant voltage power supply circuit section, as well as is fed with an electric power from said constant voltage power supply circuit section to generate a temperature detection voltage responsive to a temperature in the neighborhood of the constant voltage power supply circuit section;

said CPU temperature estimation reference data is a data table or an approximation formula obtained preliminarily by the actual measurement and determination of correlation characteristics as to a power supply voltage of said on-vehicle battery, an engine speed or a fuel supply ratio, being a ratio between power feed ON time period and power feed ON/OFF period with respect to a fuel injection solenoid valve, a temperature detection output from said temperature detection sensor, and a temperature around said microprocessor;

said CPU temperature estimation means is means for estimating an environmental temperature of said microprocessor responsive to a temperature detection output from a temperature detection sensor that is disposed in the neighborhood of said constant voltage power supply circuit section by referring to said CPU temperature estimation reference data; and said error processing means is means that operates when a temperature estimated by said CPU temperature estimation means is excessively large, and at least makes error notification.

6. The on-vehicle electronic control unit according to claim 5, wherein said power transistors act as at least one switching element of an ignition coil driving switching element or a switching element for driving a fuel injection solenoid valve; and said analog sensor group to which an electric power is fed from said constant voltage circuit section comprises various types of analog sensors for use in on-vehicle engine control including an accelerator position sensor functioning to detect a depression degree of an accelerator pedal, a throttle position sensor functioning to detect a throttle valve opening, an airflow sensor functioning to detect an air-intake of an engine, and an exhaust gas sensor functioning to detect an oxygen concentration in an exhaust gas.

7. The on-vehicle electronic control device according to claim 6, wherein said non-volatile memory further contains a switching element temperature estimation reference data, a program acting as switching element temperature estimation means, and a program acting as error processing means;

said switching element temperature estimation reference data is a data table or an approximation formula obtained preliminarily by the actual measurement and determination of correlation characteristics as to a power supply voltage of said on-vehicle battery, an engine speed or a fuel supply ratio, being a ratio between power feed ON time period and power feed ON/OFF period with respect to a fuel injection solenoid valve, a temperature detection output from said temperature detection sensor, and a temperature around a power transistor, being said switching element;

said switching element temperature estimation means is means for estimating an environmental temperature of a power transistor, being said switching element responsive to a temperature detection output from a temperature detection sensor that is disposed in the neighborhood of said constant voltage power supply circuit section by referring to said switching element temperature estimation reference data; and said error processing means is means that operates when a temperature estimated by said CPU temperature estimation means is excessively large, and a temperature estimated by said switching element temperature estimation means is excessively large, and at least makes error notification.

8. The on-vehicle electronic control unit according to claim 6, wherein a load current detected value of said constant voltage power supply circuit section is added to correlation characteristic factors in said CPU temperature estimation reference data or switching element temperature estimation reference data, and self-heating of the constant voltage power supply circuit section is estimated with a power supply voltage of said on-vehicle battery and said load current; self-heating of a power transistor, being said switching element is estimated with said engine speed or fuel ratio with respect to a fuel injection solenoid valve; and a CPU temperature or a switching element temperature is estimated in combination with an atmospheric environmental temperature contained in a temperature detection output from said temperature detection sensor.

9. The on-vehicle electronic control unit according to claim 6, wherein said error processing means further includes a hysteresis function; and an error determination output from said error processing means is operated when a temperature estimated by said CPU temperature estimation means or switching element temperature estimation means exceeds a first threshold, and is reset when said estimated temperature comes to be not more than a second threshold, being a value smaller than said first threshold.

10. The on-vehicle electronic control unit according to claim 6, wherein said on-vehicle engine control unit controls a throttle valve opening in response to a depression degree of an accelerator pedal, as well as controls a fuel injection quantity with respect to an engine responsive to an air-intake of said throttle valve;

a program, acting as said error processing means, further contains a program acting as heat-generation suppression means;

said heat-generation suppression means is means that operates when said error processing means generates an error notification output, as well as when an engine speed exceeds a predetermine suppression threshold, and that reduces a target throttle valve opening that corresponds to a depression degree of the accelerator pedal as an excess of engine speed is increased; and said heat-generation suppression means suppresses the increase of an electric power consumption of a switching element due to rise in conduction rate, being a ratio between ON time period and ON/OFF period of said switching element, as an engine speed is increased.

11. The on-vehicle electronic control unit according claim 10, wherein said on-vehicle electronic control unit is a type of containing therein a power transistor, being a driving switching element of a fuel injection solenoid valve, and a program acting as said error processing means further includes a program acting as fuel supply stop means; and said fuel supply stop means is means that operates and stops driving a fuel injection solenoid valve to suppress the heat generation of said switching element when said error processing means generates an error notification output and when an engine speed exceeds a predetermined upper limit value larger than an engine speed at which the gradual decrease is started by said heat-generation suppression means.

12. The on-vehicle electronic control unit according to claim 10, wherein said on-vehicle electronic control unit is a type of containing therein a power transistor, being a driving switching element of an ignition coil, and a program acting as said error processing means further includes programs acting as fuel supply stop means and ignition control stop means;

said fuel supply stop means is means that operates and stops driving a fuel injection solenoid valve when said error processing means generates an error notification output and when an engine speed exceeds a predetermined upper limit value larger than an engine speed at which the gradual decrease is started by said heat-generation suppression means; and said ignition control stop means is means that operates, and causes a power transistor, being a driving switching element of an ignition coil to be in an open circuit to suppress heat generation when said fuel supply stop means stops driving a fuel injection solenoid valve.

\* \* \* \* \*